US009257007B2

(12) United States Patent
Santini et al.

(10) Patent No.: US 9,257,007 B2
(45) Date of Patent: *Feb. 9, 2016

(54) CUSTOMIZING OFFERS FOR SALES OF COMBINATIONS OF VIRTUAL ITEMS

(71) Applicant: Zynga Inc., San Francisco, CA (US)

(72) Inventors: Fabio Santini, Mountain View, CA (US); Peter Pao Lai, South San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,828

(22) Filed: Jul. 16, 2014

(65) Prior Publication Data
US 2014/0329585 A1    Nov. 6, 2014

Related U.S. Application Data

(63) Continuation of application No. 13/562,055, filed on Jul. 30, 2012.

(51) Int. Cl.
*A63F 9/24*    (2006.01)
*G07F 17/32*    (2006.01)

(52) U.S. Cl.
CPC ........ *G07F 17/3244* (2013.01); *G07F 17/3281* (2013.01)

(58) Field of Classification Search
USPC ......................................... 463/31–43; 705/51
See application file for complete search history.

(56) References Cited

U.S. PATENT DOCUMENTS

| 7,269,571 | B2 | 9/2007 | Kar |
| 7,788,139 | B2 | 8/2010 | Rampell et al. |
| 8,777,754 | B1 | 7/2014 | Santini et al. |
| 2003/0083949 | A1 | 5/2003 | Kar |
| 2007/0125851 | A1 | 6/2007 | Walker et al. |
| 2007/0213124 | A1 | 9/2007 | Walker et al. |
| 2007/0299740 | A1 | 12/2007 | Kar |
| 2007/0299784 | A1 | 12/2007 | Kar |
| 2008/0071634 | A1 | 3/2008 | Rampell et al. |
| 2008/0091528 | A1 | 4/2008 | Rampell et al. |
| 2008/0201213 | A1* | 8/2008 | Lee et al. ......................... 705/14 |
| 2008/0201227 | A1 | 8/2008 | Bakewell et al. |
| 2009/0224037 | A1 | 9/2009 | Walker et al. |
| 2012/0041880 | A1 | 2/2012 | Shai |
| 2012/0272278 | A1 | 10/2012 | Bedi |

(Continued)

OTHER PUBLICATIONS

"U.S. Appl. No. 13/562,044, Notice of Allowance mailed Sep. 23, 2013", 12 pgs.

(Continued)

*Primary Examiner* — Masud Ahmed
(74) *Attorney, Agent, or Firm* — Schwegman Lundberg & Woessner, P.A.

(57) ABSTRACT

A method of customizing offers for sales of combinations of virtual items at discounted prices is disclosed. A combination of virtual items of a computer-implemented game is selected such that the sum of the values of each of the combination of virtual items has a proportion to an amount of currency in an account of a user of the computer-implemented game, the selecting being performed by a processor. An offer for a sale of the combination of the virtual items at a discounted price is generated for the user of the computer-implemented game. The offer for the sale of the combination of virtual items at the discounted price is presented to the user.

20 Claims, 23 Drawing Sheets
(8 of 23 Drawing Sheet(s) Filed in Color)

(56) References Cited

U.S. PATENT DOCUMENTS

| | | | |
|---|---|---|---|
| 2013/0005438 A1* | 1/2013 | Ocko et al. | 463/25 |
| 2013/0013404 A1* | 1/2013 | Suprock et al. | 705/14.53 |
| 2013/0097047 A1 | 4/2013 | Kim | |
| 2014/0032349 A1* | 1/2014 | Yerli, Cevat | 705/26.1 |
| 2014/0243072 A1 | 8/2014 | Santini et al. | |

OTHER PUBLICATIONS

"U.S. Appl. No. 13/562,044, Notice of Allowance mailed Dec. 26, 2013", 8 pgs.

"U.S. Appl. No. 13/562,055, Non Final Office Action mailed Oct. 11, 2013", 5 pgs.

"U.S. Appl. No. 13/562,055, Notice of Allowance mailed Apr. 29, 2014", 5 pgs.

"U.S. Appl. No. 13/562,055, PTO Response to Rule 312 Communication mailed Jul. 3, 2014", 2 pgs.

"U.S. Appl. No. 13/562,055, Response filed Feb. 11, 2014 to Non-Final Office Action dated Oct. 11, 2013", 10 pgs.

"U.S. Appl. No. 13/562,055, Final Office Action mailed Jan. 27, 2015", 9 pgs.

"U.S. Appl. No. 13/562,055, Non Final Office Action mailed Jun. 18, 2015", 12 pgs.

"U.S. Appl. No. 13/562,055, Non Final Office Action mailed Aug. 20, 2014", 8 pgs.

"U.S. Appl. No. 13/562,055, Response filed Apr. 22, 2015 to Final Office Action mailed Jan. 27, 2015", 25 pgs.

"U.S. Appl. No. 13/562,055, Response filed Nov. 20, 2014 to Non Final Office Action mailed Aug. 20, 2014", 16 pgs.

"U.S. Appl. No. 14/273,141, Final Office Action mailed Apr. 2, 2015", 5 pgs.

"U.S. Appl. No. 14/273,141, Non Final Office Action mailed Nov. 4, 2014", 10 pgs.

"U.S. Appl. No. 14/273,141, Response filed Feb. 3, 2015 to Non-Final Office Action mailed Nov. 4, 2014", 18 pgs.

"U.S. Appl. No. 14/273,141, Response filed Aug. 3, 2015 to Final Office Action mailed Apr. 2, 2015", 7 pgs.

\* cited by examiner

1600

Variant 2 and 3

| Discount | Probability |
|---|---|
| 10% | 26% |
| 15% | 22% |
| 20% | 18% |
| 25% | 14% |
| 30% | 10% |
| 35% | 6% |
| 40% | 3% |
| 100% (free) | 1% |
| Expected value | 20.3% |

Variant 4 and 5

| Discount | Probability |
|---|---|
| 20% | 26% |
| 25% | 22% |
| 30% | 18% |
| 35% | 14% |
| 40% | 10% |
| 45% | 6% |
| 50% | 3% |
| 100% (free) | 1% |
| Expected value | 30.2% |

FIG. 16B

|                  | Variant 1 | Variant 2           | Variant 3           | Variant 4           | Variant 5           | Variant 6           | Variant 7           |
|------------------|-----------|---------------------|---------------------|---------------------|---------------------|---------------------|---------------------|
| Discount         | Control   | 10% – 40%, plus 100% | 10% – 40%, plus 100% | 20% – 50%, plus 100% | 20% – 50%, plus 100% | 10% – 40%, plus 100% | 20% – 50%, plus 100% |
| Coins for spins >3 | Control | 15,000              | 25,000              | 15,000              | 25,000              | 50,000              | 50,000              |

FIG. 17

CUSTOMIZING OFFERS FOR SALES OF COMBINATIONS OF VIRTUAL ITEMS

CLAIM OF PRIORITY

The present application is a continuation of U.S. patent application Ser. No. 13/562,055, filed on Jul. 30, 2012, which is incorporated by reference herein in its entirety.

TECHNICAL FIELD

The present application relates generally to the technical field of implementing game networking systems, and, in one specific example, to providing offers for sales of combinations of virtual items associated with computer-implemented games executed on a game networking system.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be 7 able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, and the like. A player character in an online poker game may be able to play at specific tables, place bets of virtual currency for certain amounts, play or fold certain hands, play in a online poker tournament, and so forth.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are illustrated by way of example and not limitation in the figures of the accompanying drawings in which:

FIG. 16A is a table of example discounts and probabilities for two variants of weighted random offer generation;

FIG. 16B is a table of example discounts and probabilities for two additional variants of weighted random offer generation;

FIG. 17 is table of example variants of weighted random offer generation in conjunction with a price charged to the user to receive the offers;

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In various embodiments, methods and systems of providing offers for sales of combination of virtual items at discounted prices is disclosed. An offer is generated for a sale of a combination of virtual items at a discounted price. The offer for the sale of the combination of virtual items at the discounted price is presented to a user. The presenting suggests that the combination of virtual items is randomly selected from a set of virtual items or that the discounted price is randomly selected from a set of discounted prices. However, in actuality, the combination of virtual items or the discounted price may not be selected randomly.

Figure 1:
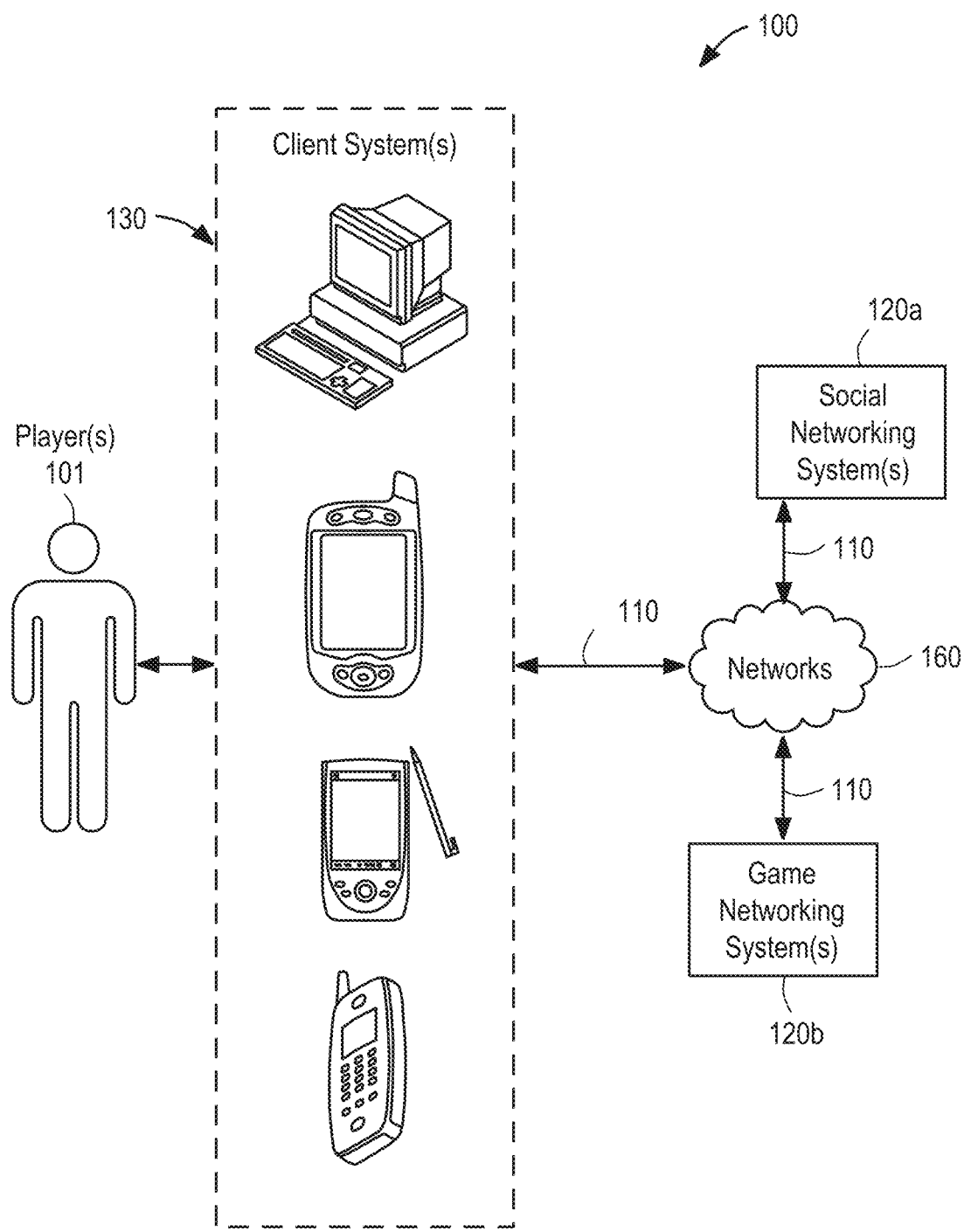
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and the like.

Although FIG. 1 illustrates a particular number of players 101, social networking systems 120a, game networking systems 120b, client system(s) 130, and networks 160, this disclosure contemplates any suitable number of player(s) 101, social networking system(s) 120a, game networking system(s) 120b, client system(s) 130, and networks 160. As an example and not by way of limitation, system 100 may include one or more game networking system(s) 120b and no social networking system 120a. As another example and not by way of limitation, system 100 may include a system that comprises both social networking system 120a and game networking system 120b. Moreover, although FIG. 1 illustrates a particular arrangement of player(s) 101, social networking system(s) 120a, game networking system(s) 120b, client system(s) 130, and networks 160, this disclosure contemplates any suitable arrangement of player(s) 101, social networking system(s) 120a, game networking system(s) 120b, client system(s) 130, and networks 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each includes one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections 110 between player(s) 101, social networking system(s) 120a, game networking system(s) 120b, client system(s) 130, and networks 160, this disclosure contemplates any suitable connections 110 between player(s) 101, social networking system(s) 120a, game networking system(s) 120b, client system(s) 130, and networks 160. As an example and not by way of limitation, in particular embodiments, client system(s) 130 may have a direct connection to social networking system(s) 120a or game networking system(s) 120b, thereby bypassing networks 160.

Online Games and Game Systems
Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including NPCs and in-game objects. The game engine also manages game state, including player character state for currently active (online) and inactive (offline) players.

An online game can be hosted by game networking system 120b, which can be accessed using any suitable connection with a suitable client system 130. A player 101 may have a game account on game networking system 120b, wherein the game account can contain a variety of information associated with the player 101 (e.g., the player's personal information, financial information, purchase history, player character state, game state, etc.). In some embodiments, a player 101 may play multiple games on game networking system 120b, which may maintain a single game account for the player 101 with respect to all the games, or multiple individual game accounts for each game with respect to the player 101. In some embodiments, game networking system 120b can assign a unique identifier to each player 101 of an online game hosted on game networking system 120b. Game networking system 120b can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player 101, updating and/or synchronizing the game state based on the game logic and each input from the player 101, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120a or game networking system 120b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game networking system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
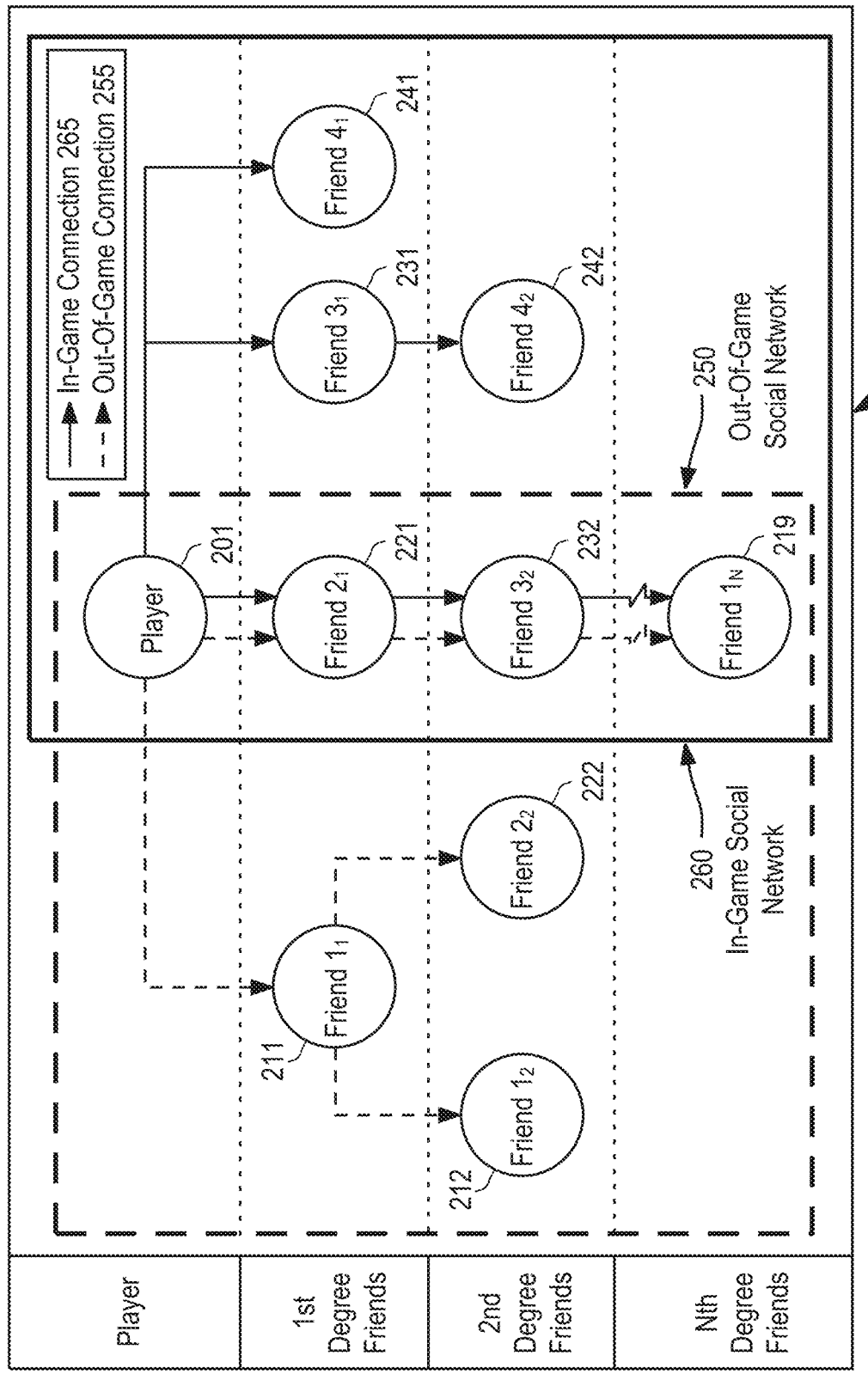
FIG. 2 is a block diagram illustrating an example of a social network within a social graph.

FIG. 2 is a block diagram illustrating an example of a social network 200 within a social graph. As shown, Player 201 can be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to whom he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260, and friend $4_2$ 242 is a second-degree friend with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access an in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Systems

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by game networking system 120b, which can be accessed over any suitable network with an appropriate client system 130. A player 101 may have a game system account on game networking system 120b, wherein the game system account can contain a variety of information about the player 101 (e.g., the player's personal information, player character state, game state, etc.). In various embodiments, an online game can be embedded into a third-party website. The game can be hosted by the networking system of the third-party website, or it can be hosted on game networking system 120b and merely accessed via the third-party website. The embedded online game can be hosted solely on a server of game networking system 120b or using a third-party vendor server. In addition, any combination of the functions of the present disclosure can be hosted on or provided from any number of distributed network resources. For example, one or more executable code objects that implement all or a portion of the game can be downloaded to a client system for execution.

Virtual Currency

In various embodiments, players within the game can acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some embodiments, virtual currency can be used to purchase one or more in-game assets or other benefits. For example, a player may be able to exchange virtual currency for a desired level, access, right, or item in an online game. In one embodiment, legal currency can be used to directly purchase an in-game asset or other benefit. The player can select the desired in-game asset or other benefit. Once appropriate selections are made, the player can place the order to purchase the in-game asset or other benefit. This order is received by the game networking system 120b, which can then process the order. If the order is processed successfully, an appropriate financial account associated with the player can be debited by the amount of virtual currency or legal currency needed to buy the selected in-game asset or other benefit.

In some embodiments, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

Marketing and Sales of Virtual Items

One of the goals of the game networking system 120b (or the operator of the game networking system 120b) may be to increase revenues from sales of virtual items. For example, a poker game executing on the game networking system 120b may include virtual items that players of the poker game can purchase for use within the game, such as gifts, collectibles, or other items. Or a farming game executing on the game networking system 120b may include virtual items that a player of the farming game can purchase to place on a virtual farm, such as trees, animals, or buildings (e.g., a Halloween tree, spooky fence, or pumpkin house).

In order to encourage users to purchase such virtual items (or more of such virtual items), the game networking system 120*b* may make offers for the sale of the virtual items as appealing as possible to the users. For example, the game networking system 120*b* may bundle a combination of virtual items together and offer them for sale to the user at a discounted price. Or the game networking system 120*b* may present an offer for a combination of items at the discounted price via a user interface that engages the user through a gaming mechanic, such as a fortune wheel or slot machine mechanic (described in more detail below). Or the game networking system 120*b* may make limited-edition offers for combinations of virtual items at discounted prices (e.g., an offer that includes combinations of virtual items or discount percentages that are rarely offered to other users of the game networking system 120*b*). Or the game networking system 120*b* may select particular virtual items to offer as a combination to the user at a discounted price based on information about the user, such as the user's preferences or behavior with respect to the game networking system 120*b*.

Figure 3:
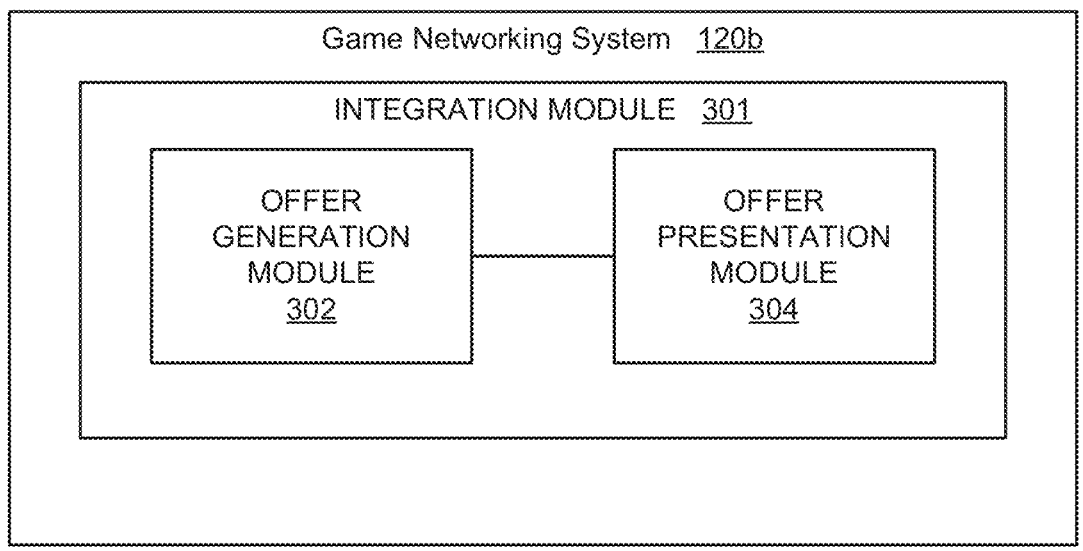
FIG. 3 is a block diagram illustrating example modules of the game networking system of FIG. 1.

FIG. 3 is a block diagram illustrating example modules of the game networking system 120*b*. The game networking system 120*b* includes an integration module 301 configured to integrate the sales and marketing of virtual items into the game networking system 120*b*. The integration module 301 may include an offer-generation module 302 configured to identify a combination of virtual items to offer for sale to a user at discounted prices. The integration module 301 may include an offer presentation module 304 configured to present the offer for the sale of the combination of virtual items at discounted prices to the user (e.g., via a user interface).

Figure 4:
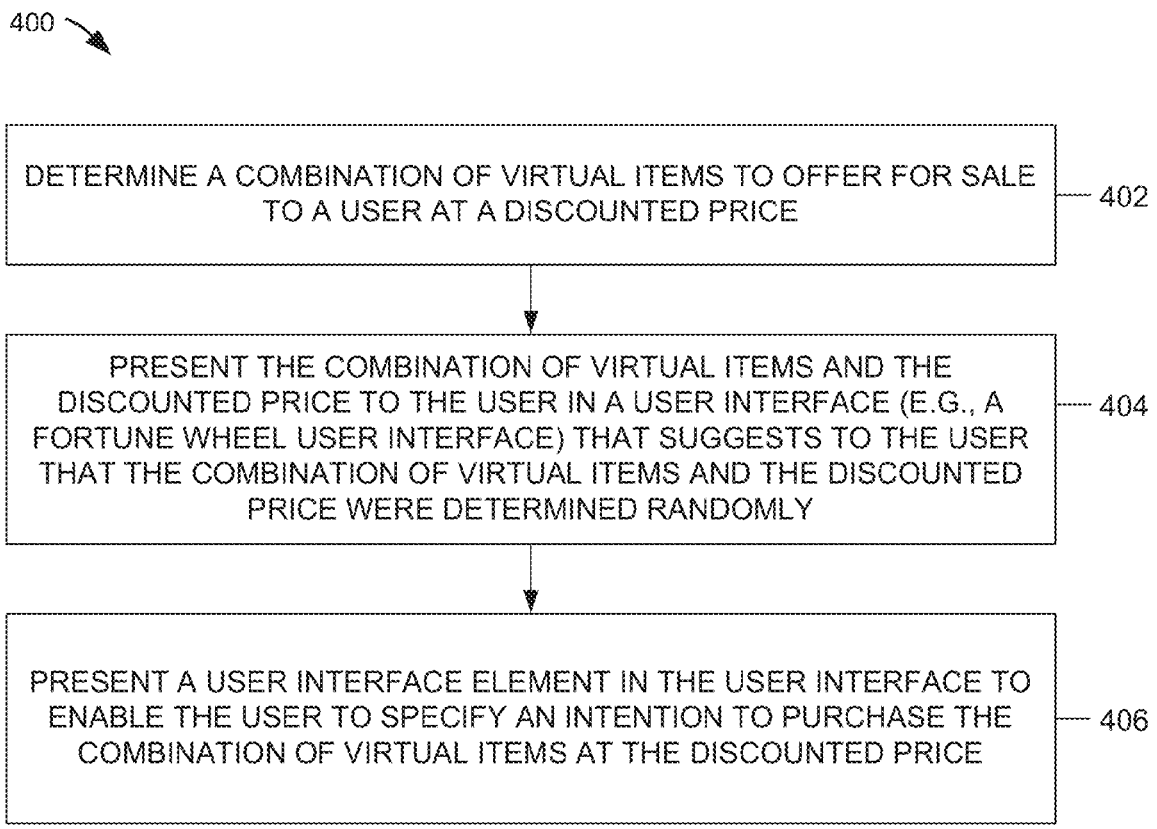
FIG. 4 is a flowchart illustrating an example method of offering a combination of virtual items for sale to a user at a discounted price.

FIG. 4 is a flowchart illustrating an example method 400 of offering a combination of virtual items for sale to a user at a discounted price. In various embodiments, the method 400 may be implemented by the integration module 301 (FIG. 3). At operation 402, the offer-generation module 302, for example, may determine an offer to sell a combination (or bundle) of virtual items at a discounted price to a user. The offer-generation module 302 may select the virtual items based on information about the user, such as the user's preferences or the user's behavior with respect to the game networking system 120*b*. For example, the offer-generation module 302 may select the virtual items based on information about the user's history of actions with respect the game networking system 120*b* (e.g., which games the user likes to play, how often the user plays, when the user last made a purchase with respect to the game networking system 120*b*, what the user last purchased, how often the user has made purchases, which features the player has engaged with within a game, how many friends the player has, data mined from the histories of the friends of the player with respect to the game networking system (including how often the player's friends have played or paid), actions the user has performed within each of various games executing on the game networking system 120*b*, and so on), information about the virtual items already in the user's possession, information about the size of the player's wallet (e.g., the amount of virtual currency that the player has to spend), information about combinations of virtual items that other users have purchased (e.g., the most popular combinations of virtual items or the most popular number of virtual items to include in a combination of virtual items), the value of the virtual items (e.g., as determined from a history of sales transactions associated with virtual items within a virtual economy of the game networking system 120*b*), the combinations of virtual items and discount percentages that are most likely to increase revenues received by an operator of the game networking system 120*b* from the players (e.g., as determined from an aggregation of purchase histories of other users), an analysis of supply and demand data pertaining to the virtual items within a virtual marketplace associated with the game networking system 120*b*, and so on. The offer-generation module 302 may select the virtual items based on information about the user that is accessed on the social networking system 120*a* (e.g., information in a profile of the user that is maintained by the user on the social networking system 120*a*, information gleaned from posts made by the user on the social networking system 120*a*, information about the user gleaned from posts made by other users of the social networking system 120*a*, and so on). In various embodiments, the virtual items and the discounted price may be determined randomly. In various embodiments, the virtual items and the discounted price may be determined randomly, but in a weighted fashion (e.g., some virtual items may be associated with a heavier weighting and thus be more likely to be selected than other virtual items).

Figure 11:
FIG. 11 is a screenshot illustrating an example embodiment of a user interface for presenting an offer for a sale of a combination of items to a user.

At operation 404, the offer-presentation module 304, for example, may present the combination of virtual items and the discounted price to the user in a user interface, such as the fortune wheel interface depicted in FIG. 11. The presentation of the combination the virtual items and the discounted price may suggest to the user that the combination of the virtual items and the discounted price were determined randomly (e.g., even if they were not actually determined randomly by the offer-generation module 302). For example, in the fortune wheel example, each reel of the fortune wheel may include depictions of various other virtual items. The offer-presentation module 304 may depict a spinning of the reels, like a slot machine, to determine the ultimate offer to the user, suggesting to the user that the offer was randomly determined. Thus, the user may feel lucky to receive a particular offer for a combination of items at a discounted price if the offer appears to the user to be better than other possible offers (e.g., offers including less valuable virtual items or offers including a lower discounted price). Or the user may have an incentive to purchase an additional offer (e.g., another spin of the fortune wheel) based on the user receiving an offer that appears to be worse than another possible offer (e.g., a combination of virtual items that appears to be more valuable than the combination that the user was offered or a chance of receiving discounted price that is better than the discounted price that the user was offered). In various embodiments, the reels may depict virtual items or discounted prices that would never actually be selected for offering to the user. For example, although a reel may depict a 50% discount as a possible value, this discount amount may never actually be selected and thus the spinning reel may never stop on that amount. Thus, in various embodiments, the possible values on the various reels may be illusory virtual items or discount amounts. However, in various other embodiments, the reels may accurately depict virtual items and amounts that may be selected for offering to the user.

At operation 406, the offer-presentation module 304, for example, may present a user interface element in the user interface to enable the user to specify an intention to accept the offer to purchase the selected combination of virtual items at the selected discounted price. For example, the user interface may include a button (e.g., "BUY") that enables the user to specify an intention to accept the offer. Then, if the user activates the user interface element, the offer-presentation module 304 may automatically collect the price of the purchase from the user (e.g., via a virtual currency account of the user, a bank account of the user, a credit card account of the user, and so on). Or the offer-presentation module 304 may present further user interfaces (e.g., dialog boxes) through which the user may designate a payment method. In various embodiments, the offer-presentation module 304 may enable the user to complete the acceptance of the offer by providing virtual currency or real money to the game networking system 120b. In exchange for receiving a payment of the offer price, the offer-presentation module 304 may provide the virtual items included in the offer to the user. For example, the offer-presentation module 304 may credit an account of the user with the virtual item or otherwise provide the user with access to the virtual items via the game networking system 120b. For example, upon the user indicating an intention to accept an offer to purchase a Halloween Tree, a Spooky Fence, and a Pumpkin House at a discounted price of 60 Farm Cash, the offer-presentation module 304 may deduct 60 Farm Cash from a Farm Cash account of the user and then provide the corresponding virtual items to the user for placing on a farm in Zynga's FarmVille game.

Figure 5:
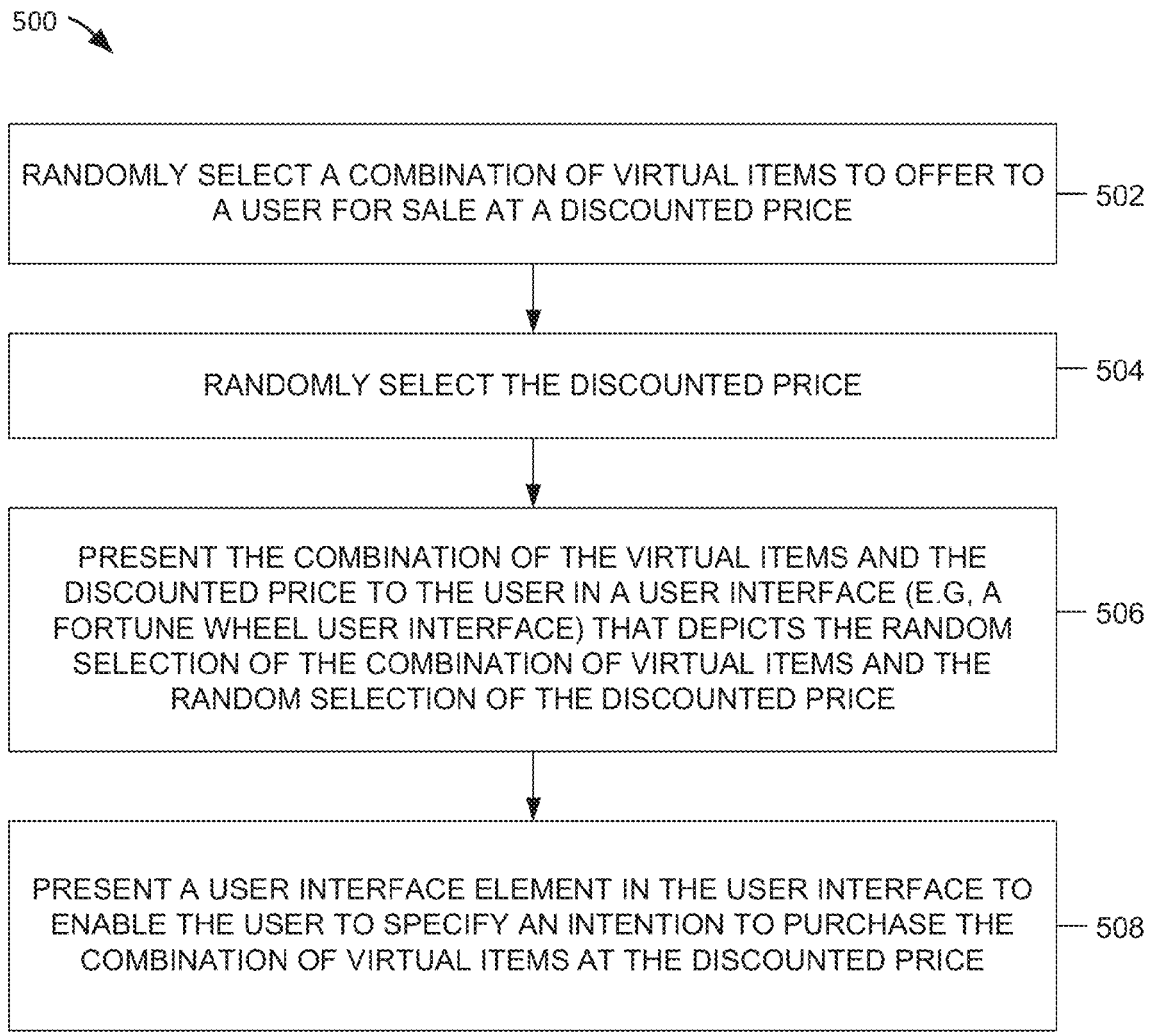
FIG. 5 is a flowchart illustrating an example method of generating a random offer for a sale of a combination of virtual items at a discounted price.

FIG. 5 is a flowchart illustrating an example method 500 of generating a random offer for a sale of a combination of virtual items at a discounted price. In various embodiments, both the combination and the discounted price are randomly determined. In various embodiments, either the combination or the discounted price is randomly determined. In various embodiments, the method 500 may be implemented by the integration module 301.

At operation 502, the offer-generation module 302, for example, randomly selects a combination of virtual items to offer to a user for sale at a discounted price. The combination of virtual items may be randomly selected from all or a subset of the virtual items of two or more games executing on the game networking system 120b. Or the combination of virtual items may be randomly selected from all or a subset of virtual items included in a single game executing on the game networking system 120b. The subset of virtual items from which a combination may be selected may be based on criteria similar to the criteria discussed above with respect to operation 402 of FIG. 4. In various embodiments, each of the virtual items may be associated with a weighting, making some virtual items more likely to be selected than other virtual items. The weighting may also be based on criteria similar to the criteria discussed above with respect to operation 402 of FIG. 4.

At operation 504, the offer-generation module 302, for example, may randomly determine the discounted price. In various embodiments, the discounted price may be randomly selected based on a set of possible discounts. For example, the set of possible discounts may include values (e.g., discount percentages) in a particular range (e.g., 0% to 50%) in 5% increments (e.g., 5%, 10%, 15%, and so on). The offer-generation module 302 may then randomly select the discounted price from the possible values in the range. In various embodiments, each of the possible discounts may be associated with a weighting, making some discounted prices more likely to be selected than other discounted prices. The weight may be based on criteria similar to the criteria discussed above with respect to operation 402 of FIG. 4.

At operation 506, the offer-presentation module 304, for example, may depict the random selection of the combination of virtual items and the random selection of the discounted price. For example, the offer-presentation module 304 may depict all or a subset of the possible virtual items on each of the reels of a fortune wheel (or slot machine) user interface. Then the offer-presentation module 304 may depict the reels spinning and a particular virtual item on each of the reels being selected. The offer-presentation module 304 may depict a reel containing all or a subset of possible discount values (e.g., discount percentages), a spinning of the reel, and a selection of one of the possible discount values. The combination of the randomly selected virtual items and randomly selected discount value may then be offered for sale to the user at the resulting discounted price. For example, the offer-presentation module 304 may calculate the sum of the values (e.g., based on an analysis of data associated with a virtual economy pertaining to the game networking system 120b) of each of the virtual items that were randomly selected. The offer-presentation module 304 may then apply the randomly selected discount value or percentage (e.g., 25%) to the sum. The offer-presentation module 304 may then offer the combination of the virtual items for sale to the user at a discounted price that is based on the randomly selected discount value.

At operation 508, the offer-presentation module 304, for example, may determine whether the user intends to accept the offer, as described above with respect to operation 406 of FIG. 4.

Figure 6:
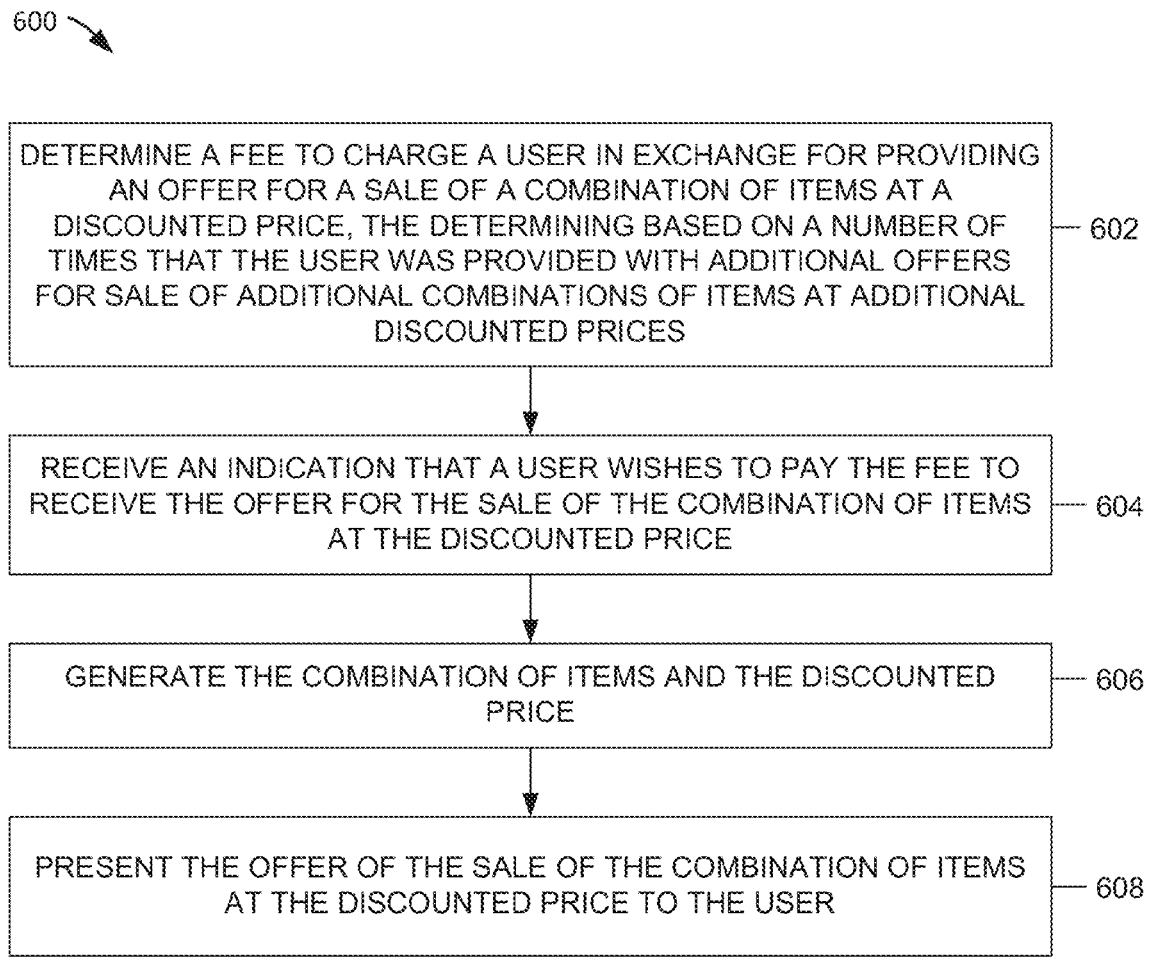
FIG. 6 is a flowchart illustrating an example method of providing an offer for a sale of a combination of items at a discounted price to a user in exchange for receiving a payment from the user.

FIG. 6 is a flowchart illustrating an example method 600 of providing an offer for a sale of a combination of items at a discounted price to a user in exchange for receiving a payment from the user. In various embodiments, the method 600 may be implemented by the integration module 301. At operation 602, the offer-generation module 302, for example, determines a fee to charge to a user in exchange for providing the user with an offer for a sale of a combination of items at a discounted price. The determination of the fee may be based on various factors, such as those described above with respect to operation 402 of FIG. 4. For example, the determination of the fee may be based on a number of times a user was provided with additional offers for the sale of additional combinations of items at additional discounted prices and whether or not the user accepted or refused those additional offers. The determination of the fee may include an analysis of previous offers, if any, that were made to the user, including the values or types of the additional combinations of items and the sizes of the additional discounted prices that were included in the previous offers. Or the determination of the fee may be based on an analysis of previous offers made to other users, including the acceptance rates of the other users for particular offers. Thus, the offer-generation module 302 may fine-tune an offer for a particular user such that the chances of the game networking system 120b receiving the maximum amount of real or virtual currency from the user for a sale of particular combinations of items are maximized. If the offer, including the combination of items that is selected or the amount of the discount that is offered, is determined randomly, the determination of the fee may be based on an amount necessary to recoup all or a particular percentage of the discounts that are ultimately accepted by the users to whom they are offered. The fee may be a virtual or real currency fee. Therefore, the fee may be charged to a virtual currency account of the user (e.g., the user's Farm Cash account in Zynga's FarmVille) or a real money account of the user (e.g., one of the user's bank accounts, credit card accounts, and so on).

At operation 604, the offer generation module 302, for example, may receive an indication that the user wishes to pay the fee to receive the offer for the sale of the combination of items at the discounted price. For example, the offer-generation module 302 may receive an indication that the user clicked a user interface element (e.g., a "BUY SPIN" button) on a user interface, such as the fortune wheel user interface depicted on FIG. 11. Or the offer-generation module 302 may otherwise determine that the user wishes to buy additional offers (e.g., that the user wants another spin on a fortune wheel). Or the offer-generation module 302 may receive pre-authorization from the user to automatically decrement an account of the user by the amount of the fee each time the user requests a new offer (e.g., by clicking the "SPIN" button on the fortune wheel user interface depicted in FIG. 11).

At operation 606, the offer-generation module 302, for example, may generate a combination of items and a discounted price to include in an offer to the user. Each of the elements of the offer may be completely randomly determined, partially randomly determined and partially predetermined, or completely predetermined, as described above with respect to FIGS. 4 and 5.

At operation 608, the offer-presentation module 304 may present the offer to the user for the sale of a selected combination of items at a selected discounted price, as described above with respect to FIGS. 4 and 5.

Figure 7:
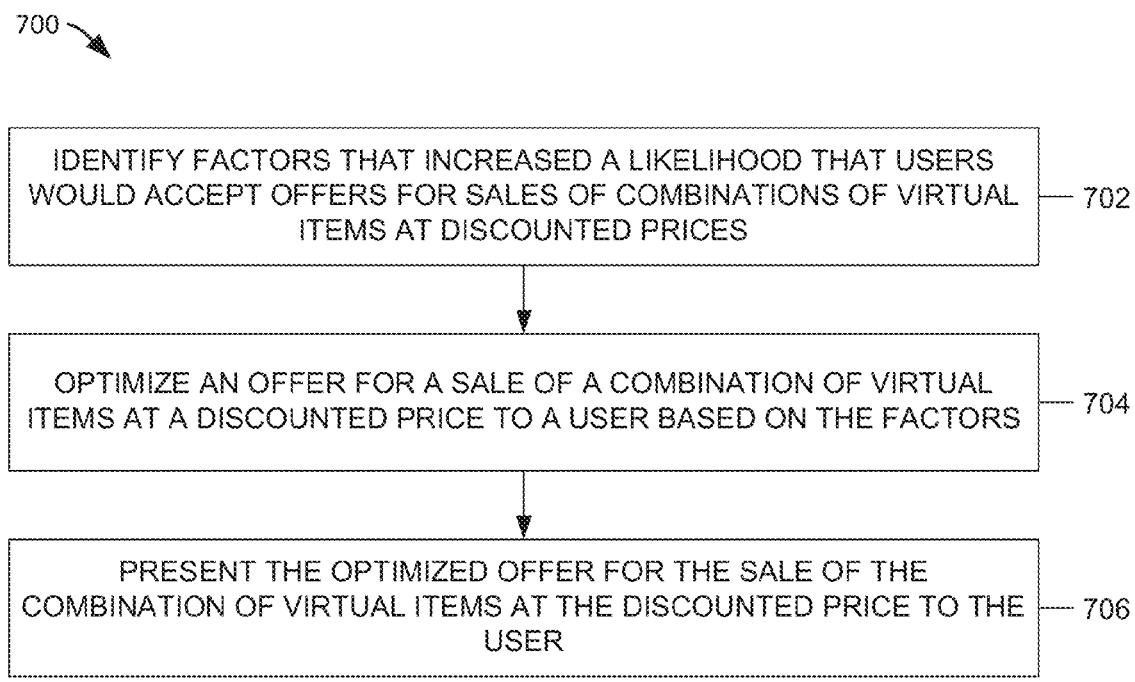
FIG. 7 is a flowchart illustrating an example method of optimizing an offer for a sale of a combination of items at a discounted price.

FIG. 7 is a flowchart illustrating an example method 700 of optimizing an offer for a sale of a combination of items at a discounted price. In various embodiments, the method 700 may be implemented by the integration module 301. At operation 702, the offer-generation module 302, for example, identifies factors that may affect an amount of revenue that the game networking system 120b may receive from users based on offering combinations of virtual items for sale to the users at discounted prices. Such factors may include a rating of how much users like the user interface (e.g., the fortune wheel user interface of FIG. 11) in which the offer is presented (e.g., a 19 out of 20 score received via feedback from the users), the discounted price of the offer relative to the amount of currency available to the user (e.g., relative to the amount of virtual currency available in the user's virtual currency account or wallet or the balance of the user's bank account), a number of items included in the combination of items (e.g., 2, 3, 4, or more), the size of the discount relative to the number of the items included in the combination or the value of the items included in the combination, a number of free offers to provide to the user before soliciting payment for additional offers, a size of a fee (if any) to charge the user in exchange for receiving offers, a number of items available for inclusion in the combination of items, how often the user is provided with offers (e.g., once per day, twice per day, twice per week, one per month, etc.), and so on.

At operation 704, the offer-generation module 302, for example, optimizes an offer for a user based on the factors identified in operation 702 or any of the information discussed above with respect to FIGS. 4 and 5, such as particular information about the user. For example, the offer-generation module 302 may generate an offer that includes a total price for the combination of items that is proportional to a balance of currency available in an account that the user is likely to use to purchase the items, includes a particular number of items in the combination of items that is most likely to lead to an acceptance by the user of the offer, or otherwise includes a value of items and a discounted price that is calculated maximized revenues that the game networking system 120b is likely from the specific user or users generally fitting a demographic of the user, includes items in which the user is likely to be interested (e.g., based on the user's actions with respect to the game networking system 120b), or otherwise tweaks the offer for the particular user based on the various identified factors and information about the user, including the user's preferences. Additionally, the offer-generation module 302 may select a user interface for presentation of the offer that has been highly rated highly (e.g., by the user or other users).

At operation 706, the offer-presentation module 304, for example, may present the generated offer to the user, as described above with respect to FIGS. 4 and 5.

Figure 8:
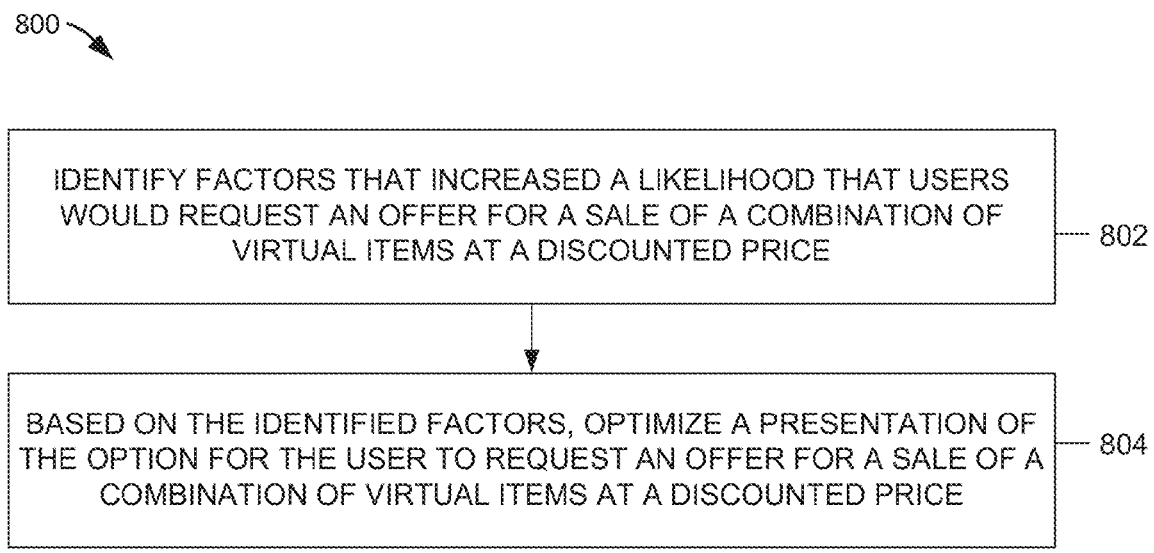
FIG. 8 is a flowchart illustrating an example method of optimizing a presentation of an option for a user to request an offer for a sale of a combination of virtual items at a discounted price.

FIG. 8 is a flowchart illustrating an example method 800 of optimizing a presentation of an option for a user to request an offer for a sale of a combination of virtual items at a discounted price. In various embodiments, the method 800 may be implemented by the integration module 301. At operation 802, the offer-generation module 302, for example, identifies factors that increase a likelihood that users will request an offer for a sale of a combination of items at a discounted price. Such factors may include, for example, parameters of a user interface element (e.g., a "New specials" button depicted in FIG. 10) that is presented within a user interface of a game that the user is playing on the game networking system 120b. Such parameters may include the text, position, size, icon, and so on, of the user interface element. Such factors may also include the timing of when the user is made aware of the option to request an offer for the sale of the combination of items at the discounted price and the duration of the notification. For example, the offer-generation module 302 may determine to notify the user of the option to request an offer for the sale of the combination of virtual items at the discounted price at specific times while the user is playing the game, such as when the user has been idle with respect to the game for a predetermined amount of time. Or the offer-generation module 302 may notify the user of a limited time frame in which the user can request an offer for the sale of the combination of items at the discounted price, thus incentivizing the user to request the offer within the limited time frame. For example, the offer-generation module 302 may notify the user that he has a particular number of seconds or minutes to request the offer for the combination of items. If the user elects not to request the offer within the limited time frame, the user may not be given another option to request the offer until a condition is met (e.g., a particular amount of time has elapsed, the user has performed a particular action within the game to unlock the ability to request the offer, and so on).

The identifying of the factors pertaining to the notifying of the user of the option to request the offer for the sale of the combination of items at the discounted price may be based on an analysis of the acceptance rate of other users of the system. For example, the offer-generation module 302 may choose to notify the user of the option to request the offer when the user reaches a particular stage or level within a game based on a determination that other users in the past have been more likely to request the offer at the stage in the game. Or the offer-generation module 302 may notify the user of an option to request the offer within one minute based on a determination that other users were more likely to request the offer when given a one-minute time limit instead of other time limits. In fact, the offer-generation module 302 may modify the notification of the option to request the offer based on any of the factors it identifies as being relevant to increasing the likelihood that the user will request the offer (e.g., upon receiving a notification of the offer). The offer-generation module 302 may further filter the factors that it determines to be relevant based on the information about the user, such as any of the information described above with respect to FIGS. 4 and 5. Thus, the offer-generation module 302 may identify particular factors as being more relevant than others based on similarities between the user and other users for which the factors influenced the rate at which the other users requested offers.

At operation 804, the offer-presentation module 304, for example, optimizes a presentation of the option for the user to request an offer for the sale of the combination of items at the discounted price. The offer-presentation module 304 may incorporate some or all of the factors deemed to be relevant to encouraging the user to request the offer when making the presentation of the offer. Thus, the timing of the notifying of the option to request the offer, the time frame in which the user has to pursue the option, the parameters of the notification itself (e.g., the text, the size of the text, the icon, the format, the appearance, and so on), or values of any of the other identified factors may be optimized to maximize the chance that the user will ultimately make a request to receive the offer.

Figure 9:
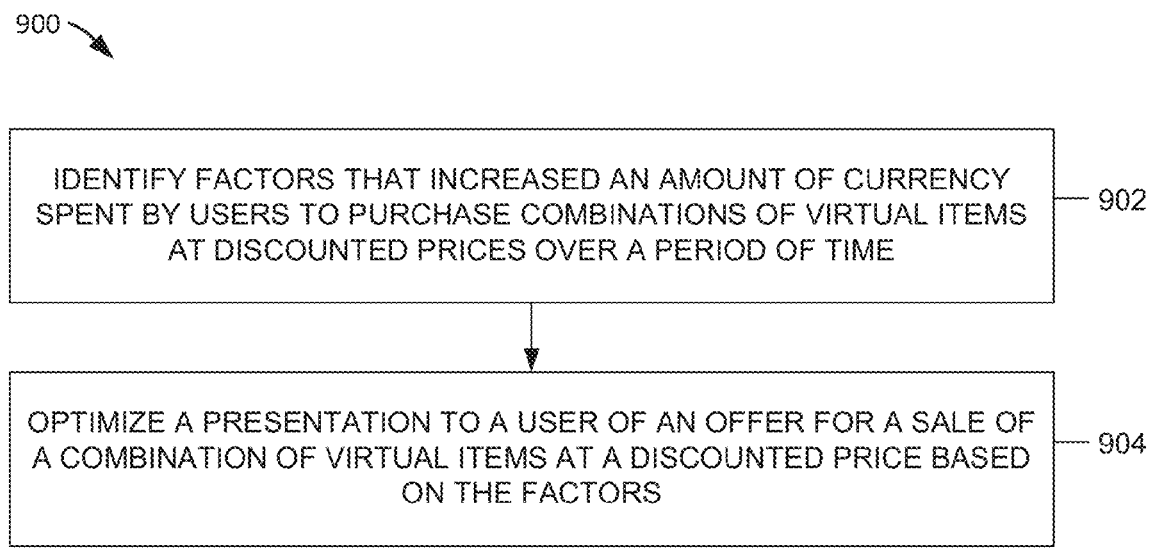
FIG. 9 is a flowchart illustrating an example method of optimizing a presentation to a user of an offer for a sale of a combination of items at a discounted price.

FIG. 9 is a flowchart illustrating an example method 900 of optimizing a presentation to a user of an offer for a sale of a combination of items at a discounted price. In various embodiments, the method 900 may be implemented by the integration module 301. At operation 902, the offer-generation module 302, for example, may identify factors that increased an amount of currency (e.g., virtual currency or real currency) spent by users to purchase combinations of items at discounted prices over a period of time. For example, the offer-generation module 302 may analyze offers that were presented to users and identify factors pertaining to the offers that increased a likelihood that the users would spend more money in accepting the offers. For example, the offer-generation module 302 may determine whether a particular user interface in which the offer was presented (e.g., a slot machine user interface, a fortune wheel user interface, etc.) was more likely to get users to spend more currency in accepting the offers. Or the offer-generation module 302 may determine that any of the factors discussed above with respect to FIG. 4-8 are particularly relevant in persuading users to spend more money in accepting offers, e.g., value of the items in the offer, amount of discount, price of offer in comparison to the size of the user's wallet (e.g., the user's balance in an virtual or real money account), number of items in the combination of items, price charged to user for providing the offer, information of the player (e.g., preferences, behavior, etc.), and so on.

For example, the offer-generation module 302 may select a particular combination of items based on the combination not having a total value that exceeds a particular percentage range (e.g., 20%-50%) of the size of the player's wallet. Or the offer-generation module 302 may select only combinations of items that include at least two or at least three items. Or the offer-generation module 302 may choose a specific discount percentage (e.g., 30%) based on the combination including less than three items (as opposed to a different discount percentage for a combination of items including three or more items). Or the offer-generation module 302 may choose a discount of greater than 50% if the combination of items includes less rare items (e.g., where the rarity of the items is based on weighted probabilities that the item would be selected in an otherwise random selection of items). Or the offer-generation module 302 may choose an offer having a higher discount percentage based on the fee charged to the player for receiving the offer having a higher amount. Or the offer-generation module 302 may determine to charge the user nothing, a small fee, or a large fee in exchange for receiving the offer. In other words, the offer-generation module 302 may generate or tweak an offer based any factor it identifies as increasing the likelihood that the user will pay more money accepting offers over a period of time (e.g., one day, one week, one month, one year, and so on).

At operation 904, the offer-presentation module 304, for example, may present an offer to the user that has been optimized based on the identified factors. The presentation of the offer may be via a user interface, such as a fortune wheel user interface, as described above with respect to FIGS. 4 and 5.

Figure 10:
FIG. 10 is a screenshot illustrating an example embodiment of a user interface for a heads-up display for a game (e.g., Zynga's FarmVille)

FIG. 10 is a screenshot illustrating an example embodiment of a user interface for a heads-up display (HUD) 1000 for a game (e.g., Zynga's FarmVille). In various embodiments, the heads-up display 1000 may be presented to the user by the integration module 301 (e.g., the offer-presentation module 304). The heads-up display 1000 may include a pop-up notification (e.g., a "New specials" button) that pops up at various selected times and notifies the user of an option to receive an offer for a sale of a combination of items at a discounted price. The notification may be optimized for presentation specifically to the particular user based on various factors, as discussed above with respect to FIG. 7. The heads-up display 1000 may also include a user interface element (e.g., a "Farm Cash" button) through which the user may access information about virtual currency that the player has available to purchase combination of items.

FIG. 11 is a screenshot illustrating an example embodiment of a user interface 1100 for presenting an offer for a sale of a combination of items to a user. In various embodiments, the user interface 1100 be presented by the integration module 301 (e.g., the offer-presentation module 304). The user interface 1100 may be a fortune-wheel-style user interface. The user interface 1100 may include one or more reels, each of which may contain spaces for one or more items that, if selected, may be included in an offer that is made to the user. In various embodiments, one or more spaces on reel may be blank (e.g., "MISS") such that less than the maximum possible number of items may be included in the offer. The user interface 1100 may include an additional reel that includes spaces for various discounts that may be included in the offer. For example, each of the spaces on the additional reel may include a percentage (e.g., 5%, 10%, 15%, 20%, 25%, and so on), representing a discount that is applied to a determined price or value of the items selected in other reels.

The user interface 1100 may include an offer summary area that specifies, for example, the number of items included in a combination of items of the offer (e.g., "2"), a total value or price of the items before a discount is applied (e.g., "18"), and a discounted price (e.g., "14") at which the user may purchase the items. The user interface 1100 may include a user interface element (e.g., a "BUY" button) with which the user may interact to specify an intention to accept the offer for the sale of the combination of items at the discounted price.

The user interface 1100 may include a spin activation area that specifies, for example, a number of additional offers that the user may request to receive (e.g., "SPINS LEFT"). Additionally, the spin activation area may include a user interface element (e.g., a "BUY SPIN" button) that the user may interact with to specify an intention to purchase an additional offer. The spin activation area may also specify a price (e.g., "50000" coins) for the additional offer. The price may be specified in virtual currency (e.g., coins, Zynga FarmVille cash, etc.) or real currency.

The user interface 1100 may include a user interface element (e.g., a "SPIN" button) through which the user may notify the game networking system 120b (e.g., via the offer-generation module 302) of an intention to purchase an additional offer. In response, the user interface 1100 may depict a spinning of the reels. The spinning of the reels may suggest to the user that the offer is randomly determined. However, as specified above, in various embodiments, the offer may be predetermined based on various factors. Or the selection of various items on the reel may be only partially random in that certain spaces on certain wheels may be weighted more heavily than others, thus making them more likely to be selected than other spaces. The user interface 1100 may include a user interface element (e.g., a "STOP" button) that the user may interact with to stop one or more of the reels from spinning. If the user does not activate the user interface element to stop the reels, the reels may come to a stop more slowly (e.g., as if slowed by resistance). In various embodiments, the offer-presentation module 304 may stop all of the reels and present the offer as soon as the user activates the user interface element to stop the reels.

The user interface 1100 may include a user interface element (e.g., an "X" button) that the user may interact with to close the user interface 1100 and, for example, return to a game that the user was playing before the user interface 1100 was presented. The user interface 1100 may include various user interface elements, such as lights, colors, or other visual effects, that are selected such that the user is more likely to engage with the user interface 1100 (e.g., purchase additional offers (or "spins" of the fortune wheel) or accept the offer for the sale of the combination of items at the discounted price.

Figure 12:
FIG. 12 is a screenshot illustrating an example embodiment of a user interface for presenting an offer for a sale of a combination of items to a user.

FIG. 12 is a screenshot illustrating an example embodiment of a user interface 1200 for presenting an offer for a sale of a combination of items to a user. In various embodiments, the user interface 1200 be presented by the integration module 301 (e.g., the offer-presentation module 304). The user interface 1200 is a fortune-wheel-style user interface similar to the user interface 1100 described above. The user interface 1200 includes reels containing spaces for items that are to be selected for inclusion in an offer as well as an additional reel containing spaces relevant to discounts to be applied to the selected items (e.g., discount percentages). The user interface 1200 includes a user interface (e.g., a red handle) that the user may interact with to specify a request to receive an offer from, for example, the offer-generation module 302 and the offer-presentation module 304. The user interface 1200 also includes user interface elements (e.g., "Spin" and "Stop" buttons) that the user may interact with to control the spinning of the reels. In various embodiments, upon the completion of a selection cycle (in which the reels are depicted as spinning and coming to a stop) the user interface 1200 may specify a combination of items (e.g., a "Halloween Tree", "Spooky Fence," and "Pumpkin House") as well as a discount that is applied to the items (e.g., "40% off"). Thus, the offer-generation module 302 may select items based on information about the games that the user is playing (e.g., FarmVille), particular items that the user may be interested in based on the user's position, level, or experience within a game, or items that are thematic with a particular time of year, season, or holiday (e.g., Halloween) that is relevant to the user. Additional examples of factors that may be considered by the offer-generation module 302 are discussed above with respect to FIG. 4-9.

The user interface 1200 may include an offer summary area that specifies the total value of the combination of items included in the offer (e.g., "140") as well as an offer for a lower price (e.g., "60") at which the user may purchase the combination of items. The user interface 1200 may include a user interface element (e.g., a "Buy All" button) that the user may interact with to specify an intention to accept the offer for the sale of the combination of items at the discounted price.

The user interface 1200 may be overlaid over an additional user interface (e.g., a Zynga FarmVille user interface) that corresponds to a game that the user is currently playing on the game networking system 120b. The user interface 1200 may be overlaid over the additional user interface such that the player may view information on the additional user interface about virtual currency (e.g., virtual coins or virtual cash) or real currency that the user has available in one or more accounts. Additionally, the user interface 1200 may be a non-modal-style user interface, such that the user may access a user interface element (e.g., an "Add Coins & Cash" button) on the additional user interface to add currency to an account (e.g., pay for virtual coins using a credit card) without losing access to the user interface 1200. The user interface 1200 may include a user interface element (e.g., an "X") that enables the user to close the user interface 1200 without accepting the offer (e.g., returning the user back to the game that the user was playing when the offer was presented).

Figure 13:
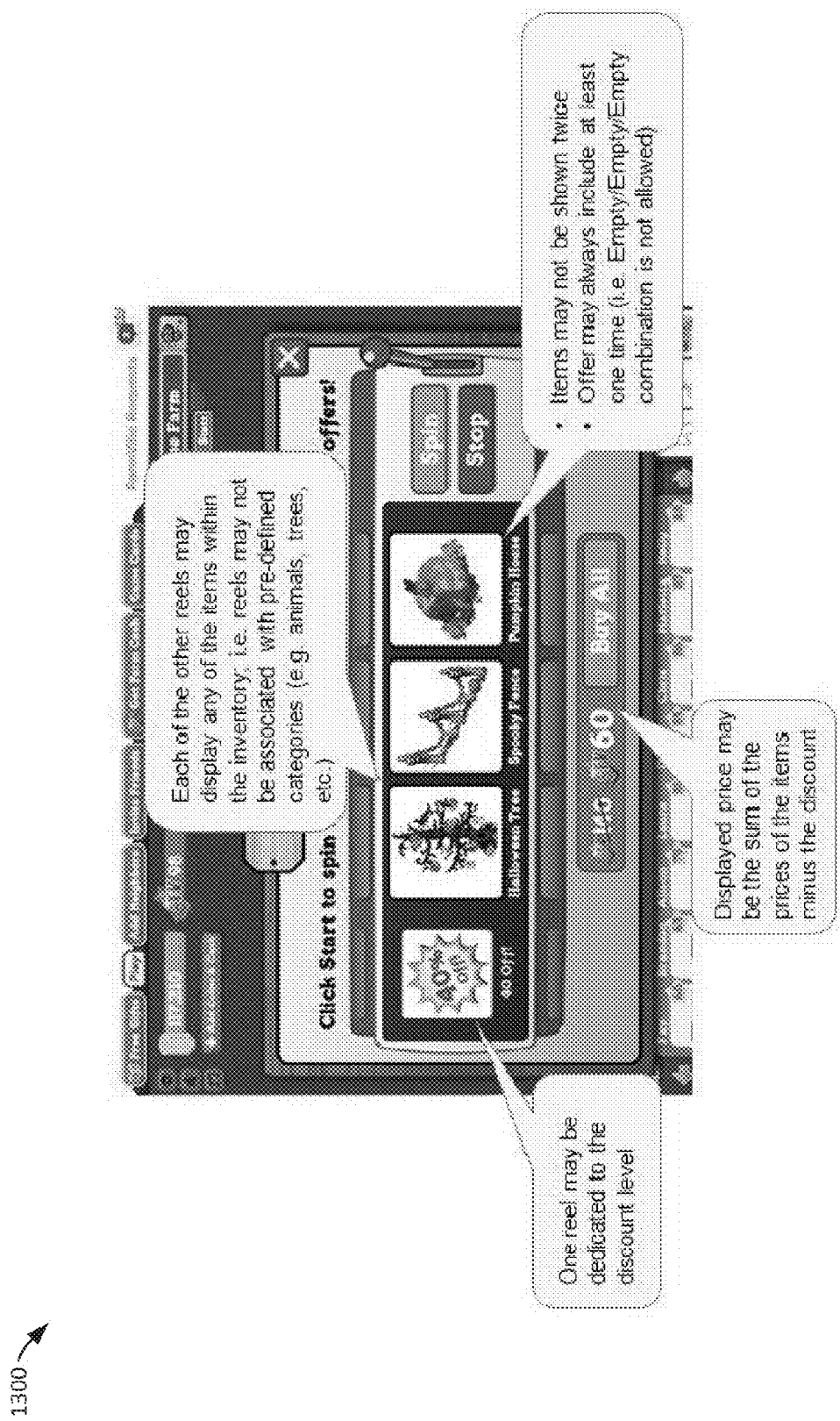
FIG. 13 is a screenshot illustrating an example embodiment of a user interface for presenting an offer for the sale of a combination of items at a discounted price.

FIG. 13 is a screenshot illustrating an example embodiment of a user interface 1300 for presenting an offer for the sale of a combination of items at a discounted price. The user interface 1300 is similar to the user interface 1200. In various embodiments, the user interface 1300 includes a reel that is dedicated to the discount level. Additionally, in various embodiments, each of the additional reels of the user interface 1300 are dedicated to items of a specific type (e.g., trees, fences, and houses). Additionally, the final price to be charged to the user for the purchase of the combination of items may be equal to the prices of each of the items minus a discount (e.g., that is determined by the discount level or percentage).

Figure 14:
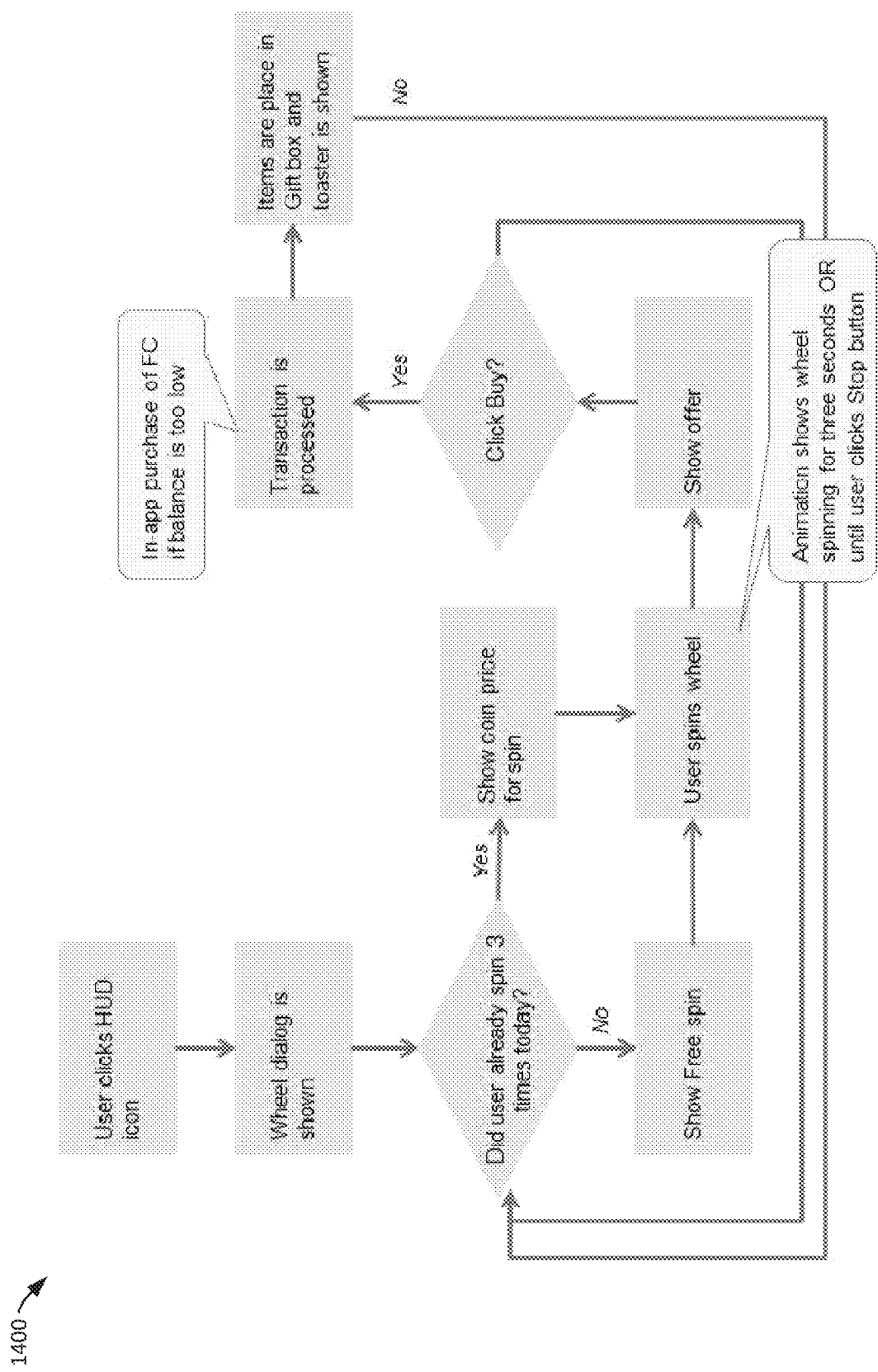
FIG. 14 is a flowchart of an example embodiment of a series of actions that may occur during an example offer for a sale of multiple items at a discount and an acceptance of that offer by the user.

FIG. 14 is a flow chart an example embodiment of a series of actions that may occur during an example offer for a sale of multiple items at a discount and an acceptance of that offer by the user. The offer-generation module 302 detects that the user has clicked an icon on a heads-up display (e.g., the "New specials" icon depicted in FIG. 10). This icon may be displayed (e.g., by the offer-presentation module 304) over the user interface of a game that the user is currently playing on the game networking system 120b based on various factors (e.g., a determination of an optimum time to present the option for the user to request the offer), as described with respect to FIG. 8.

Next, a user interface (e.g., user interface 1100 or user interface 1200) is presented (e.g., by the offer-presentation module 304). The user interface may depict the selection of the combination of items and the discount that is to be included in the offer. In various embodiments, the user may be given an option to request an offer for free based on a number of free spins that the user has already received, or any factor that is likely to increase the amount of revenue that the game networking system 120b will receive from the user over a period of time, as described with respect to FIG. 9. Otherwise, the user may be notified of an option to request the offer for a price.

Next, upon receiving a request from the user for an offer (e.g., when the user clicks the "Spin" button on user interface 1100), the offer-presentation module 304 may depict via the user interface a selection of the items and the discount amount. The user interface may include a user interface element through which the user may specify an intention to accept the offer for the sale of the items. In various embodiments, if the user is being charged virtual currency (e.g., Zynga FarmVille Cash) for the combination of items, and the user's virtual currency account is too low, the offer-generation module 302 may charge the user's real money account automatically for the needed additional virtual currency.

Next, the offer-presentation module 304 may provide the items to the user. For example, the items may be placed in a virtual gift box. Additionally, information about the completion of the transaction by the user may be sent as a "toast" notification (e.g., news that the user and his friends may wish to celebrate) to the user or friends of the user. The offer-presentation module 304 may then add the items to an inventory of the user or a player character of the user with respect to the game networking system 120b.

In various embodiments, the offer-generation module 302 may present the user with an option to request an additional offer (e.g., to spin the reels again).

Figure 15:
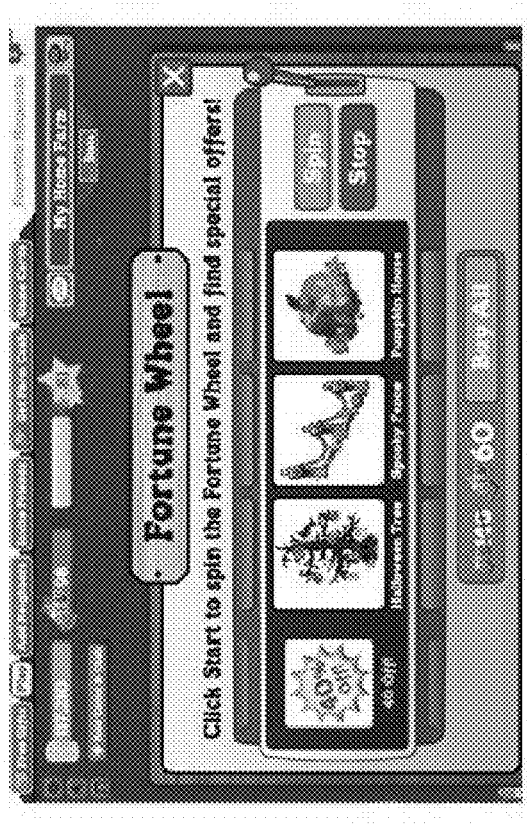
FIG. 15 is a screenshot illustrating an example embodiment of a user interface that serves as a customizable widget for presentation of offers in various contexts.

FIG. 15 is a screenshot illustrating an example embodiment of a user interface 1500 that serves as a customizable widget for presentation of offers in various contexts. Here, the user interface 1500 is architected such that the offer-presentation module 304 may present offers differently in different contexts. For example, the offer-presentation module 304 may specify the caption (default: "Fortune Wheel"), introductory text (default: "Click Start to spin the Fortune Wheel and find special offers!"), start button text (default: "Spin"), stop button text (default: "Stop"), buy button text (default: "[FC price] Buy All") or confirmation "toast" message (default: "Congratulations! You can find your items in the Gift Box.") based on whether the user interface 1500 is to be overlaid over the user interface of FarmVille, CastleVille, or another game executing on the game networking system 120*b*. The customizable elements may support predefined variables, such as the FarmCash price variable (e.g., "FC price") depicted in the default text for the Buy button. Thus, the customizable widget may replace the FarmCash price with another variable, such as a variable representing a real currency price.

FIG. 16A is a table 1600 of example discounts and probabilities for two variants of weighted random offer generation. The offer-generation module 302 may dynamically change these probabilities based on various factors, such as the factors discussed above with respect to FIG. 4-9. In this example, the lower discounts are weighted more heavily than the higher discounts. Thus, upon requesting an offer for sale of a combination of items at a discounted price, a user is more likely to receive a 10% discount than he is to receive a 100% discount.

FIG. 16B is a table 1650 of example discounts and probabilities for two additional variants of weighted random offer generation. The offer-generation module 302 may dynamically change these probabilities based on various factors, such as the factors discussed above with respect to FIG. 4-9. In this example, the lower discounts are weighted more heavily than the higher discounts. However, the overall expected value of the discounts is higher than the expected value of the discounts depicted in FIG. 16A. For example, the offer-generation module 302 may use both tables 16A and 16B in an AB testing scheme to determine which distribution is more likely to generate revenues from users over a period of time. The offer-generation module 302 may then gravitate toward the distribution that maximizes the revenues received from the users.

FIG. 17 is table 1700 of example variants of weighted random offer generation in conjunction with a price charged to the user to receive the offers. The offer-generation module 302 may dynamically change the probabilities and prices to reach an optimum range of probabilities and prices for users as a whole, users fitting a particular demographic, or a specific user, taking into account any or all of the factors discussed above.

Figure 18:
FIG. 18 a screenshot illustrating an example embodiment of a user interface of a game that could be adapted to present offers for sales of combinations of items at discounted prices.

FIG. 18 a screenshot illustrating an example embodiment of a user interface 1800 of a game that could be adapted to present offers for sales of combinations of items at discounted prices. In various embodiments, the offer-presentation module 304 could adapt the user interface 1800 to include reels for virtual items and discount amounts similar to those depicted in FIG. 11-13. Thus, the user interface 1800 would include the elements of a slots game in combination with the presentation of the offers. For example, when various combinations of items appear in the wheels, the user may be given an "automatic spin," a "payout boost" (or discount boost), a "lucky charm," or a "master key." In addition, the user may receive prize tokens that could be spent on various prizes. These prizes may or may not include some of the same items that are included in the spaces on the reels. Additionally, the user interface 1800 may include a comparison of the user's results with the results of other users, such as the results of friends of the user. In other words, the user may be able to view the credits, prize tokens, or other items that the friends of the user have won or purchased.

Figure 19:
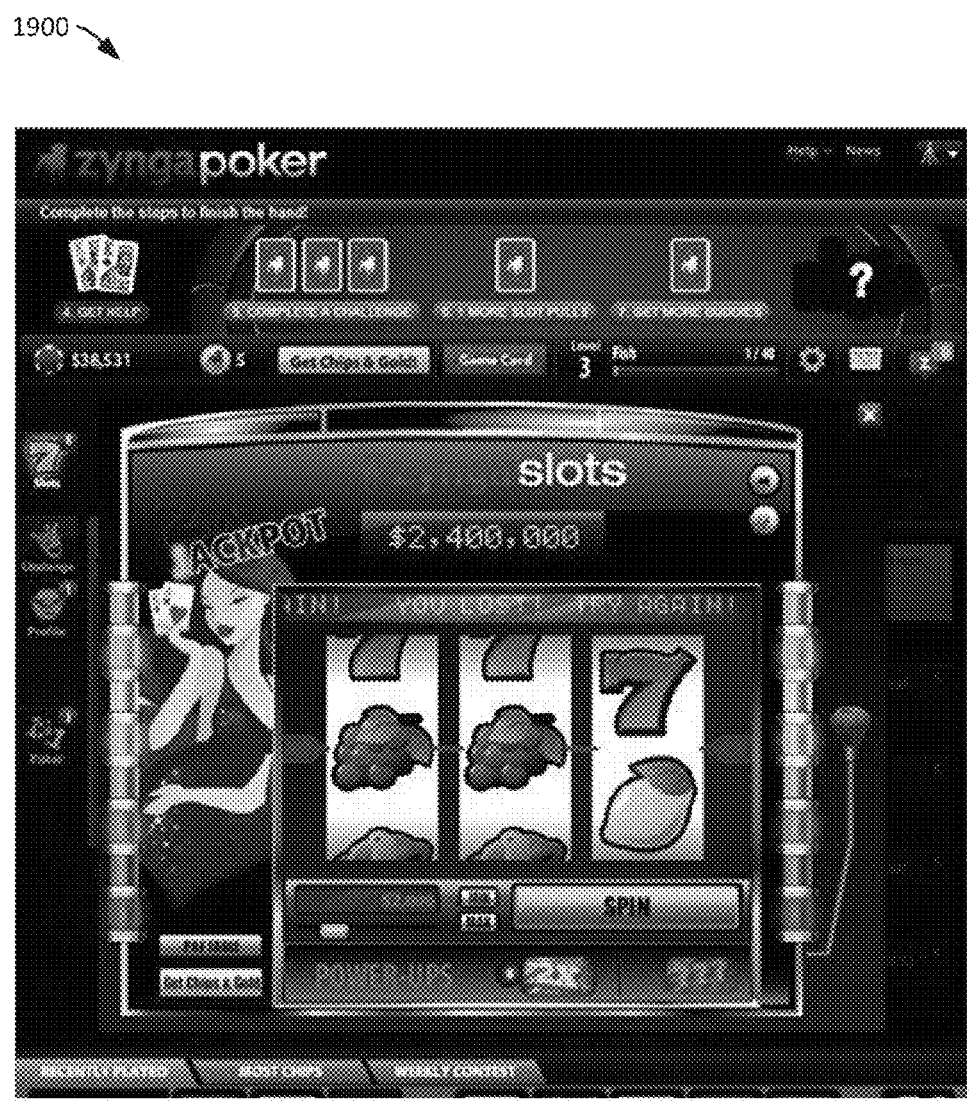
FIG. 19 is a screenshot illustrating an example embodiment of a user interface of a game that could be adapted to present offers for sales of combinations of items at discounted prices.

FIG. 19 is a screenshot illustrating an example embodiment of a user interface 1900 of a game that could be adapted to present offers for sales of combinations of items at discounted prices. In various embodiments, the offer-presentation module 304 could adapt the user interface 1900 to include reels for virtual items and discount amounts similar to those depicted in FIG. 11-13. Thus, like the user interface 1800, the user interface 1900 could consist of a merger of a slots-style game with the fortune wheel game depicted in FIG. 11-13.

In various embodiments, the offer-presentation module 304 may present an offer using a user interface like user interface 1800 or 1900 instead of a user interface like 1100, 1200, or 1300 based on a determination that the user has a preference for a slots-style game, is currently playing a gambling game (e.g., Zynga Poker), or based on any of the other factors discussed herein.

Figure 20:
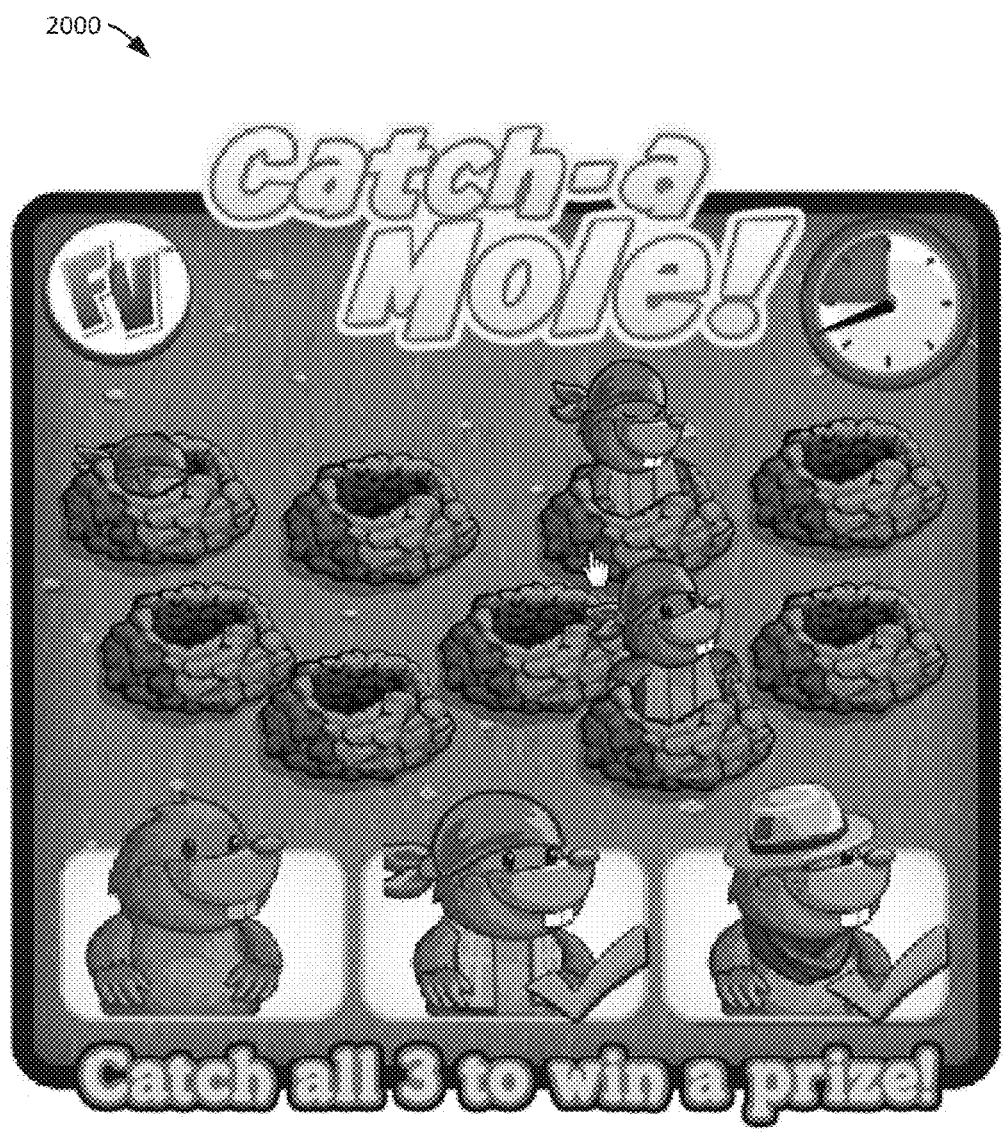
FIG. 20 is a screenshot illustrating an example embodiment of a user interface of a game that could be adapted to present offers for sales of combinations of items at discounted prices.

FIG. 20 is a screenshot illustrating an example embodiment of a user interface 2000 of a game that could be adapted to present offers for sales of combinations of items at discounted prices. The game may include elements of skill, such as a catch-a-mole game. In the catch-a-mole game, the user may be able to catch moles by clicking on them when they pop up out of holes. If the user clicks on a particular number of moles (e.g., three) within a time period (e.g., 60 seconds), the user may be presented with an offer for a sale of a combination of virtual items at a discounted price. In various embodiments, the items selected to include in the offer or the discounted price may be determined by the user's score within the game. Thus, the presentation of the offer for the sale of the combination of virtual items at a discounted price may be integrated into games that require a spectrum of luck or skill (actual or perceived) on behalf of the player.

Although some of the examples provided above are discussed with respect to virtual items, the methods and systems described herein may be equally applicable to real items (e.g., actual physical items sold by brick-and-mortar or online retailers). For example, although the user interface 1900 depicted in FIG. 19 depicts reels containing virtual items corresponding to a game executing on the game networking system 120*b*, these virtual items could be substituted with real-world items, such as clothing, food, or other goods sold at Target, Wal-Mart, Safeway, Amazon.com, eBay, or other retailers. Additionally, although the examples above primarily discuss generating and presenting offers for sales of combinations of items, the methods and systems described herein may be equally applicable to generating and presenting offers for sales of single items.

Additionally, although some of the above examples use casino-style games, such as a slots game or a fortune wheel, many other types of user interfaces may be used to present offers for the sales of combinations of items. For example, a user interface for a punch card or a scratch card may be used to provide the offers. Or a game including an element of actual or perceived skills, such as a whack-a-mole-style game (e.g., see FIG. 20), may be adapted to include a user interface to present an offer to the user based on various factors, such as the user's performance within the game.

Game Interfaces

In various embodiments, a player 101 of a client system 130 can use a browser client (e.g., Firefox, Chrome, Internet Explorer, etc.) to access the online game over the Internet (or other suitable network). For example, the user interface 1100 illustrated in FIG. 11 may be automatically generated and presented to the user in response to the user visiting or accessing the game operator's website or a third-party's website from client system 130 with a browser client. Game networking system 120b can transmit data to client system 130, thereby allowing it to display user interface 1100, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. User interface 1100 is configured to receive signals from the player 101 via client system 130. For example, the player 101 can click on user interface 1100 or enter commands from a keyboard or other suitable input device. The game engine can respond to these signals to allow game play. The display of user interface 1100 can change based on the output of the game engine, the input of the player 101, and other signals from game networking system 120b and client system 130.

The user interface 1100 can display various game components, such as the game environment, options available to the player 101 (e.g., in-game actions, preferences, settings, etc.), game results, and so forth. Some components of the user interface 1100 may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to user interface 1100. The user can also click on various user interface elements in user interface 1100 to activate various game options.

One skilled in the art would appreciate that FIG. 11 is presented merely as an example of an embodiment of one type of online game and that the present disclosure is intended to encompass a variety of game types, including gambling games, role-playing games, puzzle games, and the like.

Data Flow

Figure 21:
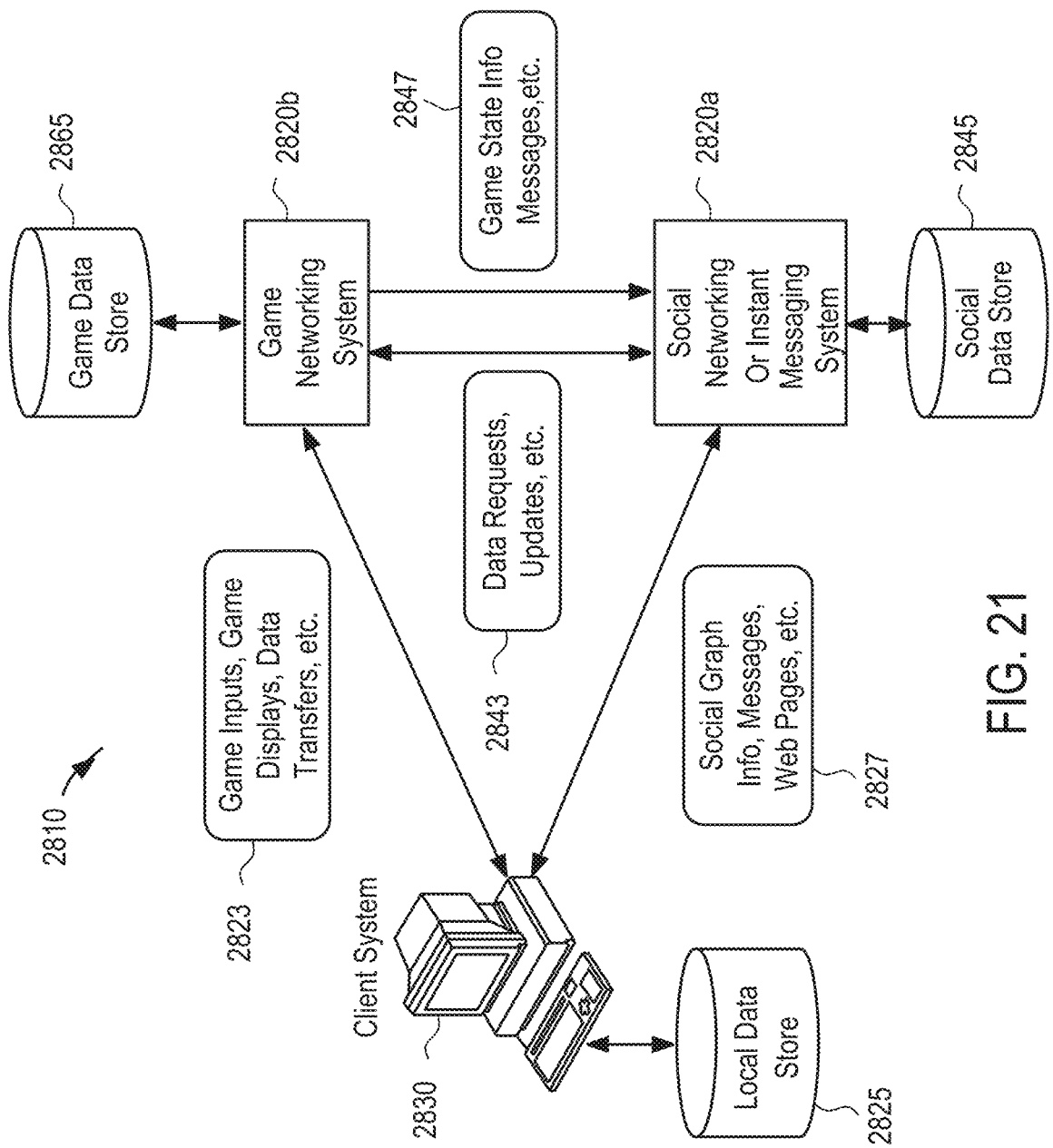
FIG. 21 is a block diagram illustrating an example data flow between the components of system.

FIG. 21 is a block diagram illustrating an example data flow between the components of system 2810. In particular embodiments, system 2810 can include client system 2830, social networking system 2820a, and game networking system 2820b. The components of system 2810 can be connected to each other in any suitable configuration, using any suitable type of connection. The components may be connected directly or over any suitable network. Client system 2830, social networking system 2820a, and game networking system 2820b can each have one or more corresponding data stores such as local data store 2825, social data store 2845, and game data store 2865, respectively. Social networking system 2820a and game networking system 2820b can also have one or more servers that can communicate with client system 2830 over an appropriate network. Social networking system 2820a and game networking system 2820b can have, for example, one or more internet servers for communicating with client system 2830 via the Internet. Similarly, social networking system 2820a and game networking system 2820b can have one or more mobile servers for communicating with client system 2830 via a mobile network (e.g., GSM, PCS, Wi-Fi, WPAN, etc.). In some embodiments, one server may be able to communicate with client system 2830 over both the Internet and a mobile network. In other embodiments, separate servers can be used.

Client system 2830 can receive and transmit data 2823 to and from game networking system 2820b. This data can include, for example, webpages, messages, game inputs, game displays, HTTP packets, data requests, transaction information, updates, and other suitable data. At some other time, or at the same time, game networking system 2820b can communicate data 2843, 2847 (e.g., game state information, game system account information, page info, messages, data requests, updates, etc.) with other networking systems, such as social networking system 2820a (e.g., Facebook, Myspace, etc.). Client system 2830 can also receive and transmit data 2827 to and from social networking system 2820a. This data can include, for example, webpages, messages, social graph information, social network displays, HTTP packets, data requests, transaction information, updates, and other suitable data.

Communication between client system 2830, social networking system 2820a, and game networking system 2820b can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HTML documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820b, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820b. Game networking system 2820b may itself operate by retrieving a copy of the BLOB from a database or an intermediate memory cache (memcache) layer. Game networking system 2820b can also deserialize the BLOB to resolve the game state parameters and execute its own game logic based on the events in the batch file of events transmitted by the client to synchronize the game state on the server side. Game networking system 2820b may then re-serialize the game state, now modified, into a BLOB and pass this to a memory cache layer for lazy updates to a persistent database.

With a client-server environment in which the online games may run, one server system, such as game networking system 2820b, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820b for further processing. In addition, multiple client systems 2830 may transmit other types of application data to game networking system 2820b.

In particular embodiments, a computer-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 2830, either caused by an action of a game player or by the game logic itself, client system 2830 may need to inform game networking system 2820b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multi-player online game hosted on a network-addressable system (such as, for example, social networking system 2820a or game networking system 2820b), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 2820a or game networking system 2820b). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 2830, the Flash client may send the events that caused the game state changes to the in-game object to game networking system 2820b. However, to expedite the processing and hence the speed of the overall gaming experience, the Flash client may collect a batch of some number of events or updates into a batch file. The number of events or updates may be determined by the Flash client dynamically or determined by game networking system 2820b based on server loads or other factors. For example, client system 2830 may send a batch file to game networking system 2820b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820b may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 2820*b* may retrieve the corresponding BLOB from the database to determine the most-recent values of the game-related data. In particular embodiments, while a player is playing the online game, game networking system 2820*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network-addressable resource or web site. Additionally, as used herein, a user may be an individual, a group, or an entity (such as a business or third-party application).

Figure 22:
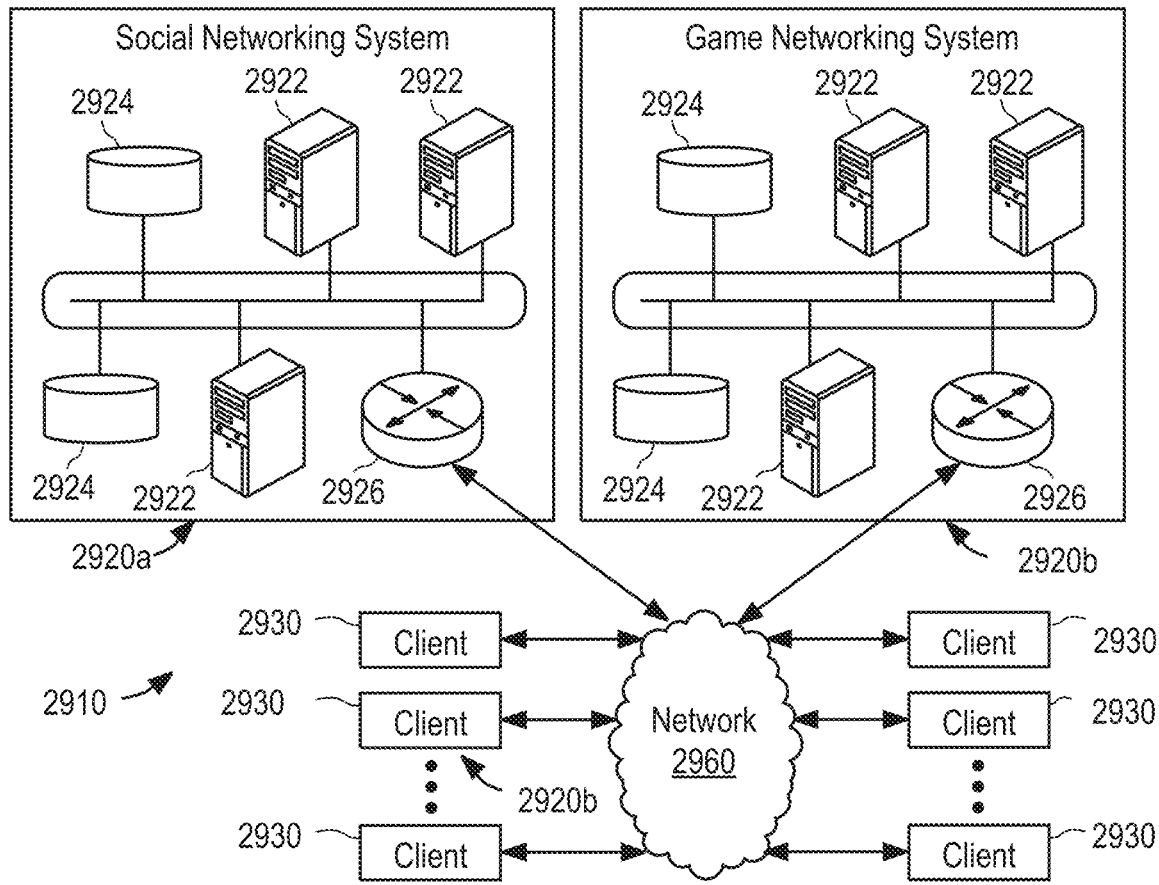
FIG. 22 is a block diagram illustrating an example network environment, in which various example embodiments may operate.

Particular embodiments may operate in a wide area network environment, such as the Internet, including multiple network-addressable systems. FIG. 22 is a block diagram illustrating an example network environment 2910, in which various example embodiments may operate. Network cloud 2960 generally represents one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 21 illustrates, particular embodiments may operate in a network environment 2910 comprising one or more networking systems, such as social networking system 2920*a*, game networking system 2920*b*, and one or more client systems 2930. The components of social networking system 2920*a* and game networking system 2920*b* operate analogously; as such, hereinafter they may be referred to simply as networking system 2920. Client systems 2930 are operably connected to the network environment 2910 via a network service provider, a wireless carrier, or any other suitable means.

Networking system 2920 is a network-addressable system that, in various example embodiments, comprises one or more physical servers 2922 and data stores 2924. The one or more physical servers 2922 are operably connected to network cloud 2960 via, by way of example, a set of routers and/or networking switches 2926. In an example embodiment, the functionality hosted by the one or more physical servers 2922 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter, servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2924 corresponds to one or more of a variety of separate and integrated databases, such as relational databases and object-oriented databases, that maintain information as an integrated collection of logically related records or files stored on one or more physical systems. Structurally, data store 2924 may generally include one or more of a large class of data storage and management systems. In particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is generally a computer or computing device including functionality for communicating (e.g., remotely) over a computer network. Client system 2930 may be a desktop computer, laptop computer, personal digital assistant (PDA), in- or out-of-car navigation system, smart phone or other cellular or mobile phone, or mobile gaming device, among other suitable computing devices. Client system 2930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier (ID), as well as information identifying or characterizing the web browser or operating system running on the user's client computing device system 2930. The request may also include location information identifying a geographic location of the user's client system 2930 or a logical network location of the user's client system 2930. The request may also include a timestamp identifying when the request was transmitted.

Although the example network environment 2910 described above and illustrated in FIG. 22 is described with respect to social networking system 2920*a* and game networking system 2920*b*, this disclosure encompasses any suitable network environment using any suitable systems. As an example and not by way of limitation, the network environment may include online media systems, online reviewing systems, online search engines, online advertising systems, or any combination of two or more such systems.

Figure 23:
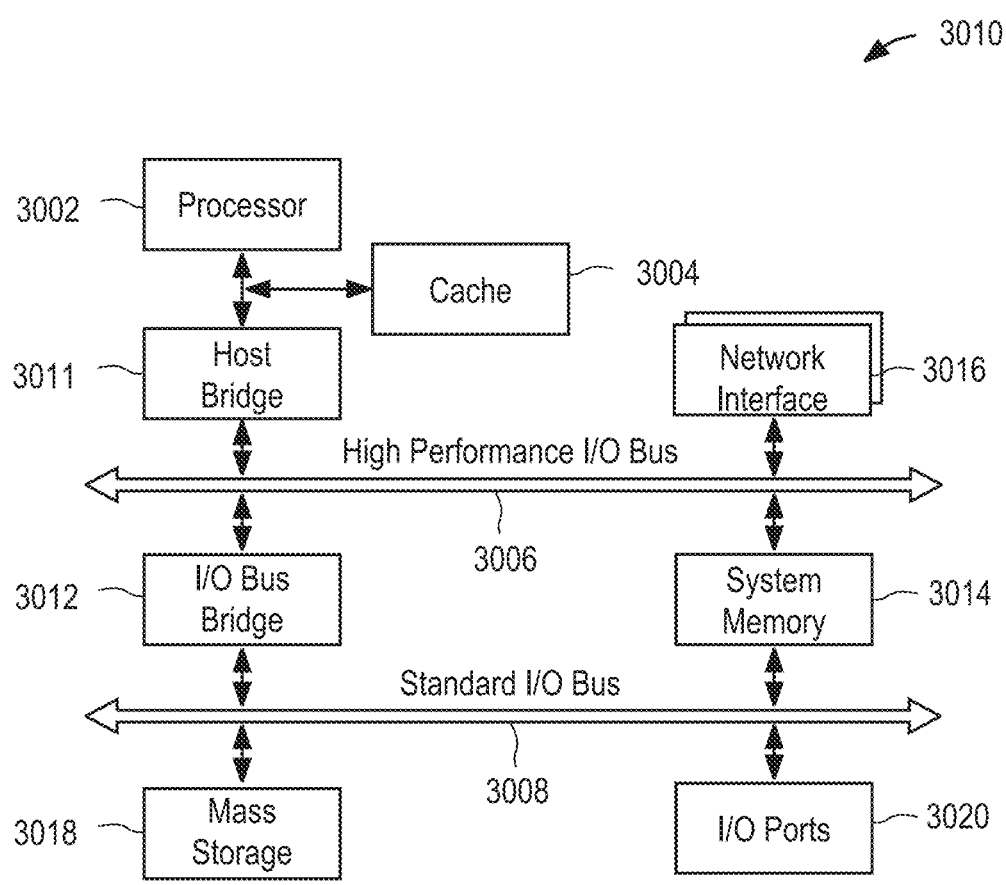
FIG. 23 is a block diagram illustrating an example computing system architecture, which may be used to implement a server or a client system.

FIG. 23 is a block diagram illustrating an example computing system architecture, which may be used to implement server 2922 or a client system 2930 of FIG. 22. In one embodiment, hardware system 3010 comprises a processor 3002, a cache memory 3004, and one or more executable modules and drivers, stored on a tangible computer-readable medium, directed to the functions described herein. Additionally, hardware system 3010 may include a high performance input/output (I/O) bus 3006 and a standard I/O bus 3008. A host bridge 3011 may couple processor 3002 to high performance I/O bus 3006, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 (e.g., DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures, and various components of hardware system 3010 may be rearranged. For example, cache memory 3004 may be on-chip with processor 3002. Alternatively, cache memory 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the terms "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The invention claimed is:

1. A method of customizing a user interface generated at a game networking server system for communication to a client device system of a user of the game networking server system, the game networking server system being separate from the client device system, the user interface pertaining to an offer for a sale of a combination of virtual items to the user, the method comprising:
    selecting the combination of the virtual items from a set of virtual items maintained as game state data in a data store at the game networking server system, the selecting based on correspondences between the user and the set of virtual items, the correspondences derived at least in part from an analysis of a history of actions of the user on the game networking server system that relate to the set of virtual items;
    generating the offer for the sale of the combination of virtual items to the user, the offer including a discounted price for the combination of virtual items;
    communicating the offer to the client device system of the user; and
    providing the combination of the virtual items to the user based on a detection of an acceptance of the offer by the user, the providing including updating the game state data, the selecting, generating, communicating, and providing being performed by at least one processor of the game networking server system.

2. The method of claim 1, further comprising:
    determining a probability that the user will purchase the combination of virtual items at the discounted price; and
    selecting the offer based on the probability.

3. The method of claim 2, further comprising calculating the probability based on an analysis of an aggregation of purchase histories of additional users of the game networking system.

4. The method of claim 3, further comprising selecting the additional users based on a similarity between a game account of the user and game accounts of each of the additional users.

5. The method of claim 4, further comprising selecting the additional users based on strengths of relationship between the user and the additional users.

6. The method of claim 4, wherein the similarity pertains to activity levels of the user and the additional users with respect to a particular game executing on the game networking system in which the combination of virtual items is usable.

7. The method of claim 1, further comprising:
    determining rarities of the virtual items with respect to the game networking system; and
    selecting the discounted price based on the rarities of the virtual items.

8. A system comprising:
    one or more modules implemented by one or more processors, the one or more modules configured to:
    select a combination of virtual items from a set of virtual items maintained as game state data in a data store at a game networking server system, the selecting based on correspondences between a user and the set of virtual items, the correspondences derived at least in part from an analysis of a history of actions of the user on the game networking server system that relate to the set of virtual items;
    generate an offer for a sale of the combination of the virtual items at a discounted price to the user, the offer including a discounted price for the combination of virtual items;
    communicate the offer to the client device system of the user; and,
    provide the combination of the virtual items to the user based on a detection of an acceptance of the offer by the user, the providing including updating the game state data.

9. The system of claim 8, wherein the one or more modules are further configured to:
    determine a probability that the user will purchase the combination of virtual items at the discounted price; and
    select the offer is based on the probability.

10. The system of claim 9, wherein the one or more modules are further configured to calculate the probability based on an analysis of an aggregation of purchase histories of additional users of the game networking system.

11. The system of claim 10, wherein the one or more modules are further configured to select the additional users based on a similarity between a game account of the user and game accounts of each of the additional users.

12. The system of claim 11, wherein the one or more modules are further configured to select the additional users based on strengths of relationship between the user and the additional users.

13. The system of claim 12, wherein the similarity pertains to activity levels of the user and the additional users with respect to a particular game executing on the game networking system in which the combination of virtual items is usable.

14. The system of claim 13, wherein the one or more modules are further configured to:
    determine rarities of the virtual items with respect to the game networking system; and
    select the discounted price based on the rarities of the virtual items.

15. A non-transitory machine-readable storage medium comprising a set of instructions that, when executed by at least one processor, causes the at least one processor to perform operations, the operations comprising:
    selecting a combination of virtual items from a set of virtual items maintained as game state data in a data store at a game networking server system, the selecting based on correspondences between a user and the set of virtual items, the correspondences derived at least in part from an analysis of a history of actions of the user on the game networking server system that relate to the set of virtual items;

generating an offer for a sale of the combination of the virtual items at a discounted price to the user, the offer including a discounted price for the combination of virtual items; and communicating the offer to the client system of the user; and providing the combination of the virtual items to the user based on a detection of an acceptance of the offer by the user, the providing including updating the game state data.

16. The non-transitory machine-readable storage medium of claim 15, further comprising:
determining a probability that the user will purchase the combination of virtual items at the discounted price; and
selecting the offer is based on the probability.

17. The non-transitory machine-readable storage medium of claim 16, further comprising calculating the probability based on an analysis of an aggregation of purchase histories of additional users of the game networking system.

18. The non-transitory machine-readable storage medium of claim 17, further comprising selecting the additional users based on a similarity between a game account of the user and game accounts of each of the additional users.

19. The non-transitory machine-readable storage medium of claim 18, further comprising selecting the additional users based on strengths of relationship between the user and the additional users.

20. The non-transitory machine-readable storage medium of claim 19, wherein the similarity pertains to activity levels of the user and the additional users with respect to a particular game executing on the game networking system in which the combination of virtual items is usable.

* * * * *